(12) United States Patent
El Shormbably et al.

(10) Patent No.: US 11,119,457 B2
(45) Date of Patent: Sep. 14, 2021

(54) METHOD FOR CONTROLLING ELECTRIC DRIVE SYSTEM AND ELECTRIC DRIVE SYSTEM

(71) Applicant: King Fahd University of Petroleum and Minerals, Dhahran (SA)

(72) Inventors: Mohamed Mamdouh El Shormbably, Dhahran (SA); Mohamed Ali Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/453,082

(22) Filed: Jun. 26, 2019

(65) Prior Publication Data

US 2020/0409320 A1 Dec. 31, 2020

(51) Int. Cl.
*G05B 13/04* (2006.01)
*G05B 17/02* (2006.01)
*G05B 19/05* (2006.01)

(52) U.S. Cl.
CPC ........... *G05B 13/048* (2013.01); *G05B 17/02* (2013.01); *G05B 19/056* (2013.01)

(58) Field of Classification Search
CPC ..................... G05B 13/048; G05B 2219/42058
See application file for complete search history.

(56) References Cited

U.S. PATENT DOCUMENTS

2011/0031910 A1* 2/2011 Takahashi ........... H02P 21/0003
318/400.3

2011/0169436 A1* 7/2011 Takahashi ............... H02P 23/14
318/400.3

(Continued)

FOREIGN PATENT DOCUMENTS

CN 106130429 A 11/2016
CN 106533311 A * 3/2017

(Continued)

OTHER PUBLICATIONS

Vazquez et al., Model Predictive Control for Power Converters and Drives: Advances and Trends, Feb. 2017, IEEE, vol. 64, No. 2, 935-947 (Year: 2017).*

(Continued)

*Primary Examiner* — Bickey Dhakal
(74) *Attorney, Agent, or Firm* — Oblon, McClelland, Maier & Neustadt, L.L.P.

(57) ABSTRACT

A method for controlling an electric drive system and the electric drive system. The method includes: measuring an external variable; estimating a control variable for a current sampling step with a mathematical model; predicting a control variable for a future sampling step for each of a plurality of candidate voltage vectors selected for the future sampling step; and calculating a cost function, and identifying a primary voltage vector giving a minimum, where the cost function is defined as a deviation between the predicted stator flux and the reference stator flux. The method further includes: predefining a lookup table giving a correlation between a nonzero voltage vector and a voltage vector group including four candidate voltage vectors, where the plurality of candidate voltage vectors is selected referring the lookup table. The electric drive system includes motor, power converter, and controller, and configured to perform the method.

16 Claims, 14 Drawing Sheets

(56) References Cited

U.S. PATENT DOCUMENTS

| | | | | |
|---|---|---|---|---|
| 2013/0009611 A1* | 1/2013 | Tripathi | ............... | H02P 21/12 |
| | | | | 322/23 |
| 2013/0147442 A1* | 6/2013 | Tripathi | ............... | H02P 9/30 |
| | | | | 322/89 |
| 2014/0126252 A1* | 5/2014 | Geyer | ............... | H02M 7/487 |
| | | | | 363/40 |
| 2016/0020717 A1* | 1/2016 | Tang | ............... | H02P 21/05 |
| | | | | 318/798 |
| 2016/0190967 A1* | 6/2016 | Takano | ............... | H02P 25/086 |
| | | | | 318/254.1 |
| 2016/0226368 A1* | 8/2016 | Al-Hokayem | ............... | H02P 21/30 |
| 2016/0276919 A1* | 9/2016 | Geyer | ............... | H03K 5/08 |
| 2018/0054112 A1* | 2/2018 | Al-Hokayem | ............... | H02M 1/12 |
| 2018/0145579 A1* | 5/2018 | Spudic | ............... | H02M 1/12 |

FOREIGN PATENT DOCUMENTS

| | | | |
|---|---|---|---|
| CN | 107196571 A | 9/2017 | |
| CN | 107565872 A | 1/2018 | |
| CN | 207166388 U | 3/2018 | |

OTHER PUBLICATIONS

Karlovsky, et al. ; Induction Motor Drive Direct Torque Control and Predictive Torque Control Comparison Based on Switching Pattern Analysis ; MDPI Energies ; Jul. 8, 2018 ; 14 Pages.

* cited by examiner (a)

(b)

(a)

(b)

METHOD FOR CONTROLLING ELECTRIC DRIVE SYSTEM AND ELECTRIC DRIVE SYSTEM

STATEMENT OF PRIOR DISCLOSURE BY AN INVENTOR

Aspects of the present disclosure were described in "Efficient Predictive Torque Control for Induction Motor Drive," by M. Mamdouh and M. A. Abido, which was published in *IEEE Transactions on Industrial Electronics* on Nov. 7, 2018 and is incorporated herein by reference in its entirety.

BACKGROUND

Technical Field

The present disclosure is directed to a method and system for controlling electric drives and power systems, and more particularly to a method for controlling an induction motor system and the induction motor system configured to be controlled with the method.

Description of the Related Art

The technique known as model predictive control (MPC) technique has proved its efficiency and competence to classical control methods in many applications. The concept of MPC is based on the calculation of the future behavior of the system, in order to use this information to calculate values for actuating variables. Execution of the predictive algorithm can be divided into three main steps: estimation of the variables that cannot be measured, prediction of the future behavior of the system, and identification of outputs, according to a previously designed control law. Motivated by the maturity of the mathematical models and recent powerful microprocessors, MPC has recently rapidly evolved in the fields of electric drives and power systems. MPC contains merits such as faster dynamics, easier concept of design, simpler structure and realization, etc. See for example, J. H. Lee, "Model predictive control: Review of the three decades of development," *Int. J. Control. Autom. Syst.*, vol. 9, no. 3, pp. 415-424, 2011, C. E. Garcia, D. M. Prett, and M. Moran, "Model predictive control: Theory and practice—A survey," *Automatica*, vol. 25, no. 3, pp. 335-348, 1989, A. Linder and R. Kennel, "Model Predictive Control for Electrical Drives," *Power Electron. Spec. Conf. 2005. PESC 05. IEEE 36th*, pp. 1793-1799, 2005, J. Rodriguez and P. Cortes "Predictive Control of Power Converters and Electrical Drives," First Edition. John Wiley & Sons, 2012, the entire contents of which are incorporated herein by reference.

Among variations of MPC, finite control set MPC (FCS-MPC) has become the most popular for power electronic applications, since it fits the discrete nature of power converters, includes cost function, system constraints as well as further nonlinearities that can be easily considered and controlled. The FCS-MPC method is based on following main steps: a) measurement of machine state at a current sampling step; b) prediction of control variables for a next sampling step for all feasible voltage vectors; c) selection of a primary voltage vector that minimizes a cost function; and d) application of the primary voltage vector as a switching state for the next sampling step. An example of the cost function for calculation is given by:

$$J = \sum_{i=1}^{N} w_{x_i}(r_i - x_i)^2 + \sum_{i=1}^{N} w_{u_i}\Delta u_i^2, \quad (1)$$

where,
- $x_i$: $i^{th}$ control variable (e.g. predicted stator flux),
- $r_i$: $i^{th}$ reference variable (e.g. required stator flux),
- $u_i$: $i^{th}$ manipulated variable (e.g. switching state of power converter),
- $w_{x_i}$: weighting coefficient reflecting the relative importance of $x_i$,
- $w_{u_i}$: weighting coefficient penalizing relative large changes in $u_i$.

See for example, J. Rodriguez, M. P. Kazmierkowski, J. R. Espinoza, P. Zanchetta, H. Abu-Rub, H. A. Young, and C. A. Rojas, "State of the Art of Finite Control Set Model Predictive Control in Power Electronics," *IEEE Trans. Ind. Informatics*, vol. 9, no. 2, pp. 1003-1016, 2013, F. Wang, X. Mei, J. Rodriguez, and R. Kennel, "Model Predictive Control for Electrical Drive Systems-An Overview," *Ces Trans. Electr. Mach. Syst.*, vol. 1, no. 3, pp. 219-230, 2017, and https://en.wikipedia.org/wiki/Model_predictive_control, the entire contents of which are incorporated herein by reference.

Regardless the simplicity of FCS-MPC method and its ability to handle nonlinearity and constraints, two main drawbacks are widely reported regarding its implementation. The first drawback is the high computation cost related to the prediction and identification steps of the algorithm which grows rapidly if the number of admissible voltage vectors increase. This is typically the case for multi-phase and multi-level converters. Therefore, for these systems, even if a short prediction horizon is used, a long duration time of the sampling step is unavoidable for the algorithm to select the primary voltage vector among all the available ones. Increasing a duration time of the sampling step is reflected negatively on the quality of the control variable (torque, flux, and current).

The second problem is related to the cost function design for cases when there are two or more equally important objectives to be attained. For instance, both torque and flux errors should be minimized in predictive torque control (PTC). The conventional method is to form one cost function consisting of the weighted sum of the individual objectives. The weighting factors related to each objective are of great influence on the overall system performance and its design is not a trivial task. See, J. Rodriguez, M. P. Kazmierkowski, J. R. Espinoza, P. Zanchetta, H. Abu-Rub, H. A. Young, and C. A. Rojas, id., S. Vazquez, J. Rodriguez, M. Rivera, L. G. Franquelo, and M. Norambuena, "Model Predictive Control for Power Converters and Drives: Advances and Trends," *IEEE Trans. Ind. Electron.*, vol. 64, no. 2, pp. 935-947, 2017, P. Cortes, S. Kouro, B. La Rocca, R. Vargas, J. Rodriguez, J. I. Leon, S. Vazquez, and L. G. Franquelo, "Guidelines for weighting factors design in Model Predictive Control of power converters and drives," *IEEE Int. Conf. Ind. Technol.*, pp. 1-7, 2009, the entire contents of which are incorporated herein by reference.

Several solutions have been reported to overcome these problems. For the first problem, mathematical techniques have been adopted to deal with long horizon prediction of multi-level inverters. See for example, T. Geyer, "Computationally efficient model predictive direct torque control," *IEEE Trans. Power Electron.*, vol. 26, no. 10, pp. 2804-2816, 2011, T. Geyer and D. E. Quevedo, "Multistep finite control set model predictive control for power electronics," *IEEE Trans. Power Electron.*, vol. 29, no. 12, pp. 6836-6846, 2014, the entire contents of which are incorporated herein by reference. Another trend is to use a reduced number of voltage vectors for the prediction and identification stages of PTC algorithm. Only four voltage vectors among the available seven voltage vectors of the two levels voltage source inverter (2L-VSI) for prediction and identification are used. These four vectors are nominated at each control sample based on switching frequency reduction criterion. This method is characterized by noticeable reduction in the average switching frequency. Nevertheless, the torque and flux ripple increased significantly compared to the conventional method. See, F. Wang, Z. Zhang, A. Davari, J. Rodriguez, and R. Kennel, "An experimental assessment of finite-state Predictive Torque Control for electrical drives by considering different online-optimization methods," *Control Eng. Pract.*, vol. 31, pp. 1-8, 2014, the entire contents of which are incorporated herein by reference. A similar idea has been proposed to use only three voltage vectors at each sample. These three vectors are selected based on the location of the stator flux vector and the sign of torque error. This technique results in reduction in the average switching frequency and renders good performance compared to the conventional method. See, M. Habibullah, D. D.-C. Lu, D. Xiao, and M. F. Rahman, "A Simplified Finite-State Predictive Direct Torque Control for Induction Motor Drive," *IEEE Trans. Ind. Electron.*, vol. 63, no. 6, pp. 3964-3975, 2016, the entire contents of which are incorporated herein by reference.

In another report, the cost function was reformulated to include the difference between the reference and the candidate voltage vectors. Based on the location of the reference voltage, one zero and one active voltage vector are selected and evaluated. This method reduces the computation cost since the prediction needs to be executed only once to generate the reference voltage vector. See, C. Xia, S. Member, T. Liu, T. Shi, and Z. Song, "A Simplified Finite-Control-Set Model-Predictive Control for Power Converters," *IEEE Trans. Ind. Informatics*, vol. 10, no. 2, pp. 991-1002, 2014, the entire contents of which are incorporated herein by reference.

On the other hand, many solutions have been proposed for the flux weighting factor design in the PTC algorithm. It was illustrated that the value of flux weighting factor depends on the operating point. Therefore, offline design methods have to be repeated in order to reoptimize the flux weighting factor itself if the operating point changes. See, P. Cortes et al., id., S. A. Davari, D. A. Khaburi, and R. Kennel, *"An improved FCS-MPC algorithm for an induction motor with an imposed optimized weighting factor,"* IEEE Trans. Power Electron., vol. 27, no. 3, pp. 1540-1551, 2012, the entire contents of which are incorporated herein by reference.

Other solutions deal with the problem as a multi-objective improvement problem. For these methods, the cost function for each objective is calculated individually then a decision to be made is to choose the voltage vector which improves all the cost functions. The decision can be based on a ranking algorithm, fuzzy decision making criterion or other multi-objective improvement methods. P. Zanchetta, "Heuristic Multi-Objective Optimization for Cost Function Weights Selection in Finite States Model Predictive Control," 2011 *IEEE Work. Predict. Control Electr. Drives Power Electron.*, pp. 70-75, 2011, F. Villarroel, J. R. Espinoza, C. A. Rojas, J. Rodriguez, M. Rivera, and D. Sbarbaro, "Multiobjective Switching State Selector for Finite-States Model Predictive Control Based on Fuzzy Decision Making in a Matrix Converter," *IEEE Trans. Ind. Electron.*, vol. 60, no. 2, pp. 589-599, 2013, A. A. Ahmed, B.-K. Koh, H. S. Park, K.-B. Lee, and Y. Il Lee, "Finite Control Set Model Predictive Control Method for Torque Control of Induction Motors using a State Tracking Cost Index," *IEEE Trans. Ind. Electron.*, vol. 46, no. c, pp. 1-1, 2016, the entire contents of which are incorporated herein by reference.

The weighting factor can be eliminated by expressing a flux vector reference as a function of the torque reference or by modifying the cost function to be based on voltage vectors only. This results in a cost function consisting of the error between the reference and the predicted flux vectors only. See for example, Y. Zhang and H. Yang, "Model-Predictive Flux Control of Induction Motor Drives With Switching Instant Optimization," *IEEE Trans. Energy Convers.*, vol. 30, no. 3, pp. 1113-1122, 2015, C. Xia et al., the entire contents of which are incorporated herein by reference.

An assessment of several proposed weighting factor selection methods has been reported in using torque ripple, flux ripple, average switching frequency and total harmonic distortion (THD) of current as judging criteria. The assessment revealed that 1) the online improvement methods are superior to the conventional weighting sum method and 2) the weighting factor elimination (WFE) method results in the lowest torque ripple and lowest current harmonic distortion. See, M. Mamdouh, M. A. Abido, and Z. Hamouz, "Weighting Factor Selection Techniques for Predictive Torque Control of Induction Motor Drives: A Comparison Study," *Arab. J. Sci. Eng.*, vol. 43, no. 2, pp. 433-445, February 2018, the entire contents of which are incorporated herein by reference.

However, no work has been reported so far that solved simultaneously both of the above two problems in the FCS-MPC method, the high computation cost and the influence of the weighting factor in the cost function design, to the best knowledge of the inventors.

Accordingly, it is an object of the present disclosure to provide an FCS-MPC method for controlling an electric drive system that solves both problems simultaneously and an electric drive system controlled with the FCS-MPC method.

SUMMARY

A method for controlling an electric drive system includes: predefining an initial condition as a voltage vector specifying a switching state of a power converter; applying a primary voltage vector as the switching state of the power converter; measuring an external variable including a rotor angular speed and a stator current; estimating a control variable for a current sampling step with a mathematical model and the external variable; predicting a control variable for a future sampling step for each of a plurality of candidate voltage vectors selected for the future sampling step; calculating a cost function, and identifying a primary voltage vector giving a minimum of the cost function as the primary voltage vector to be applied in the future sampling step, where the cost function is given as a deviation between the predicted stator flux and the reference stator flux.

In another exemplary embodiment, the method further includes: predefining a lookup table including a correlation between a nonzero voltage vector and a voltage vector group, the voltage vector group including four candidate voltage vectors (CVVs), the nonzero voltage vector represents one of six possible switching states of the 2L-VSI with on state for at least one of but not all of the three phase outputs, the lookup table covers the correlations for all six possible cases of the nonzero voltage vector, and the plurality of candidate voltage vectors is selected referring the lookup table based on a given nonzero voltage vector which is given by a) the primary voltage vector, when the primary voltage vector was the nonzero voltage vector; or b) a last appeared nonzero voltage vector, when the primary voltage vector was not the nonzero voltage vector.

In another exemplary embodiment, an electric drive system includes: an induction motor; a power converter configured to convert a DC input voltage to three phase outputs through a two level-voltage source inverter (2L-VSI); a DC supply configured to supply the DC input to the power converter; a controller configured to control the power converter; and a sensor configured to detect an external variable and send an electrical signal to the controller, where the controller further comprising a human interface, a processor and a memory, each connected by a bus line, and the controller is further configured to perform each of the steps of the method claims.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
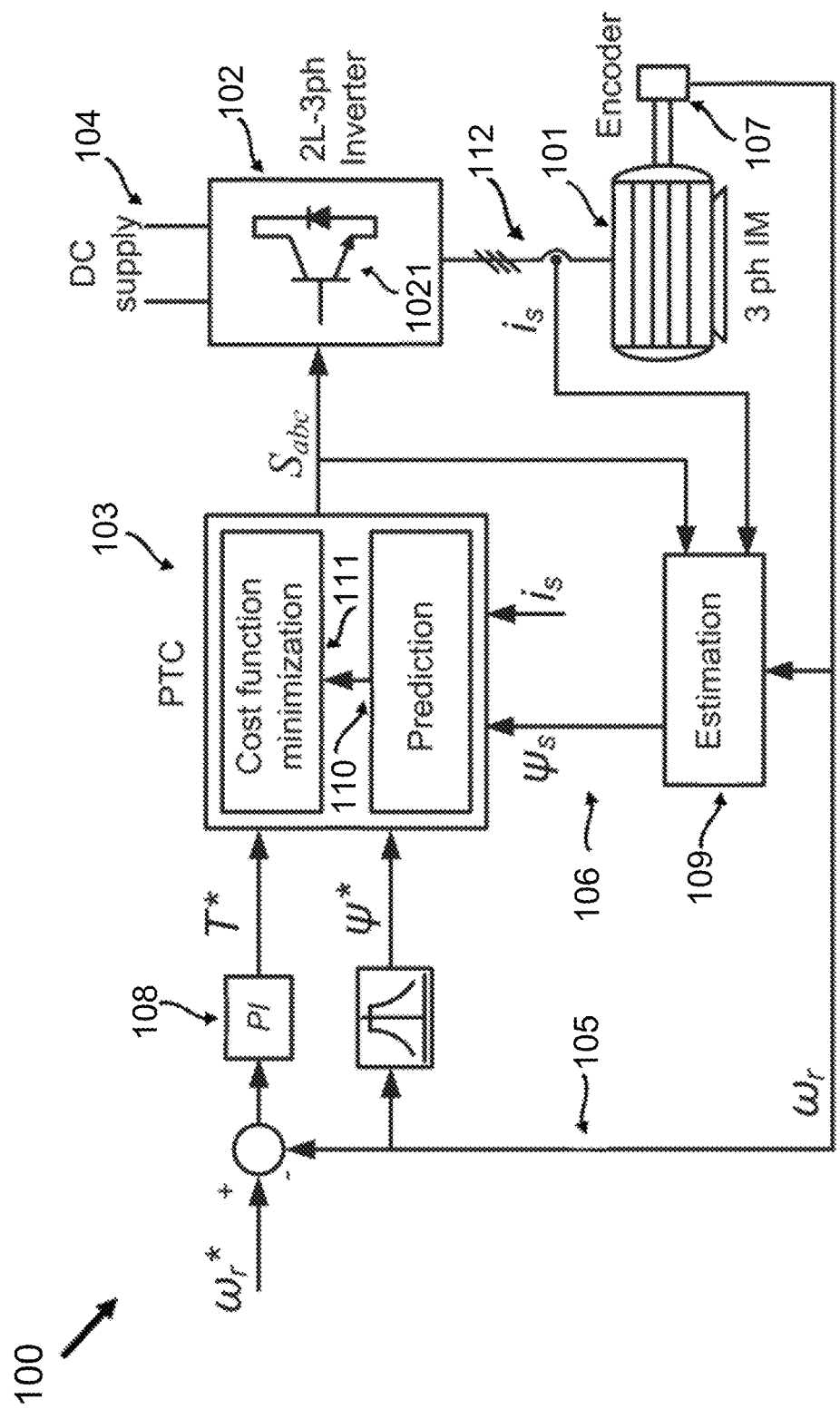
FIG. 1 illustrates an exemplary schematic diagram of an electric drive system according to certain embodiments of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to a method for controlling an electric drive system and an electric drive system configured to be controlled with the method.

FIG. 1 illustrates an exemplary schematic diagram of an electric drive system according to certain embodiments of the present disclosure. Here the electric drive system 100 comprises a three phase-induction motor 101, a power converter 102, and a controller 103. The power converter 102 is configured to convert a DC supply 104 to three phase outputs through a two level-voltage source inverter (2L-VSI) 1021 which is further configured to supply the three phase outputs to the three phase-induction motor. The controller 103 comprises an outer loop 105 and an inner loop 106. An encoder 107 attached to the rotor axis and a current sensor 112 measure and send to the controller 103 a rotor angular speed and a stator current.

The 2L-VSI 1021 has eight possible switching states by combinations of on/off output states of three phases as listed by $V_n$ in Table I. The eight possible combinations of the three phase outputs are represented by voltage vectors (hereafter "VVs") $V_n(S_a, S_b, S_c)$ (n=0 to 7), where $S_a$, $S_b$, and $S_c$ each represents on (1) or off (0) states of the three phase outputs. The VVs are also denoted by $S_{abc}(=[S_a\ S_b\ S_c]^T)$. The VVs representing the switching states or the three phase outputs of the 2L-VSI play as the manipulated variable in the FCS-MPC method controlling the electric drive system.

TABLE I

SWITCHING STATES OF 2L-VSI

|   | $V_0$ | $V_1$ | $V_2$ | $V_3$ | $V_4$ | $V_5$ | $V_6$ | $V_7$ |
|---|---|---|---|---|---|---|---|---|
| $S_a$ | 0 | 1 | 1 | 0 | 0 | 0 | 1 | 1 |
| $S_b$ | 0 | 0 | 1 | 1 | 1 | 0 | 0 | 1 |
| $S_c$ | 0 | 0 | 0 | 0 | 1 | 1 | 1 | 1 |

The outer loop 105 is configured to generate a torque reference T* by a proportional integral (PI) controller 108, based on a reference rotor angular speed $\omega_r^*$ and a rotor angular speed $\omega_r$ detected by the encoder 107. On the other hand, the inner loop further comprises an estimation bock 109, a prediction block 110, and a cost function minimization block 111.

The estimation block 109 is configured to estimate control variables of the induction motor 101, by adopting a mathematical model and based on a voltage vector, $S_{abc}$ together with a DC supply voltage $V_{dc}$ applied to the 2L-VSI and measured external variables comprising a stator current $i_s$ and the rotor angular speed $\omega_r$. The control variables estimated comprise a stator flux $\psi_s$, a rotor flux $\psi_r$.

The prediction block 110 is configured to select in each of sampling steps a plurality of candidate voltage vectors (CVVs) as candidates for a primary voltage vector $V_{opt}$ to be applied as a switching state of the 2L-VSI in a following sampling step. The prediction block is further configured to predict future values of the control variables corresponding to each of the plurality of CVVs when applied as the switching state of the 2L-VSI in the following sampling step.

The cost function minimization block 111 is configured to choose a primary VV giving a minimum value of a predefined cost function from among the plurality of CVVs selected at the prediction block. The predefined cost function adopted in a certain embodiment of the present disclosure represents a deviation between the reference stator flux vector and the predicted stator flux vector, as detailed below in description of the mathematical model.

In a certain embodiment of the present disclosure, the controller is configured to store a predefined lookup table before starting a first sampling step, where the predefined lookup table defines a correlation between a primary voltage vector that was adopted at a previous sampling step or given by an initial condition (denoted as $V_{old}$) and a voltage vector group (VVG) comprising four CVVs, where the predefined lookup table is given by Table II, detail of which is described later. Further, the prediction block of the controller is configured to select a VVG comprising the four CVVs as the plurality of CVVs, by referring the lookup table and identifying the VVG corresponding to a given $V_{old}$, in each of the sampling steps.

TABLE II

VOLTAGE VECTOR GROUP SELECTION

| $V_{old}$ OR $V_{NZ}$ | VVG |
|---|---|
| $V_1$ | [$V_6$ $V_1$ $V_2$ $V_0$] |
| $V_2$ | [$V_1$ $V_2$ $V_3$ $V_7$] |
| $V_3$ | [$V_2$ $V_3$ $V_4$ $V_0$] |
| $V_4$ | [$V_3$ $V_4$ $V_5$ $V_7$] |
| $V_5$ | [$V_4$ $V_5$ $V_6$ $V_0$] |
| $V_6$ | [$V_5$ $V_6$ $V_1$ $V_7$] |

Table II defines the VVG correlated with the $V_{old}$ exclusively when the $V_{old}$ is a nonzero voltage vector $V_{NZ}$. The nonzero voltage vector $V_{NZ}$ represents one of six possible switching states of the 2L-VSI, namely, $V_1$ to $V_6$ of the Table I, with on (with value 1) state for at least one of but not all of the three phase outputs. As indicated here, the lookup table covers the correlation between the nonzero voltage vector $V_{NZ}$ and the VVG for all six possible cases of the $V_{NZ}$. For other situations where the $V_{old}$ was not the nonzero vector, a $V_{NZ}$ is given by a last appeared $V_{NZ}$ in an earlier sampling step if available, or otherwise given by an initial condition.

A combination of the four CVVs in a VVG which is correlated exclusively to a given $V_{old}$ or $V_{NZ}$ in Table II is generated from the given $V_{old}$ or $V_{NZ}$ by allowing changes at most one of the three states ($S_a$, $S_b$, $S_c$). For example, when the given $V_{old}$ or $V_{NZ}$ was $V_6$ (1, 0, 1), the four allowable VVs are $V_5$ (0, 0, 1), $V_6$ (1, 0, 1), $V_7$ (1, 1, 1), and $V_1$ (1,0,0), as confirmed in Table II.

The model equations required for the estimation, the prediction and the identification made in each of the sampling steps are described below. When a stationary reference frame, commonly called αβ frame is adopted and a stator current $i_s$ and a rotor flux $\psi_r$ are considered as state variables, the model dynamic equations of an induction motor can be expressed as follows.

$$\dot{x} = Ax + Bu \qquad (2)$$

$$A = \begin{bmatrix} \frac{-1}{\tau_\sigma} & 0 & \frac{k_r}{R_\sigma \tau_\sigma \tau_r} & \frac{k_r}{R_\sigma \tau_\sigma}\omega_r \\ 0 & \frac{-1}{\tau_\sigma} & -\frac{k_r}{R_\sigma \tau_\sigma}\omega_r & \frac{k_r}{R_\sigma \tau_\sigma \tau_r} \\ \frac{L_m}{\tau_r} & 0 & \frac{-1}{\tau_r} & -\omega_r \\ 0 & \frac{L_m}{\tau_r} & \omega_r & \frac{-1}{\tau_r} \end{bmatrix}, \qquad (3)$$

$$B = \begin{bmatrix} \frac{1}{R_\sigma \tau_\sigma} & 0 \\ 0 & \frac{1}{R_\sigma \tau_\sigma} \\ 0 & 0 \\ 0 & 0 \end{bmatrix}$$

where, $x=[i_{s\alpha}\ i_{s\beta}\ \psi_{r\alpha}\ \psi_{r\beta}]^T$ represents the control variables, $u=[u_{s\alpha}\ u_{s\beta}]^T$, the stator input voltage vector, $\omega_r$, a rotor angular speed observed from the stationary reference frame, $R_s$ and $R_r$, stator resistance and rotor resistance, respectively, $L_s$, $L_r$ and $L_m$, stator inductance, rotor inductance, and mutual inductance, respectively, $$\tau_\sigma = \frac{L_\sigma}{R_\sigma},$$

a stator transient time constant, where $$L_\sigma = L_s\left(1 - \frac{L_m^2}{L_s L_r}\right)$$

is a transient inductance of the induction motor, $R_\sigma = R_s + k_r^2 R_r$ is the equivalent resistance, with $$k_r = \frac{L_m}{L_r}$$

as a rotor coupling factor, $$\tau_r = \frac{L_r}{R_r},$$

the rotor time constant. See for example, C. A. Rojas, J. I. Yuz, M. Aguirre, and J. Rodriguez, "A comparison of discrete-time models for model predictive control of induction motor drives," *IEEE International Conference on Industrial Technology (ICIT)*, 2015, pp. 568-573, the entire contents of which are incorporated herein by reference.

The stator input voltage vector in an orthogonal $\alpha\beta$ frame, $u = u_{s\alpha\beta} = [u_{s\alpha}, u_{s\beta}]^T$ is given by the voltage vector $S_{abc}$ representing the three phase outputs of the 2L-VSI as $$u_{s\alpha\beta} = V_{dc} T_{Cl} S_{abc}, \tag{4}$$

where $V_{dc}$ is the DC link voltage and $T_{Cl}$ represents Clarke transformation given by $$T_{Cl} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix}. \tag{5}$$

The electromagnetic torque T can be calculated as $$T = 3/2 n_p(\psi_s \times i_s), \tag{6}$$

where $n_p$ represents a number of pole pairs.

The prediction step in MPC requires the knowledge of the discrete model equation discretized for the sampling steps. Several discretization methods are available in literature. See for example, C. A. Rojas et al. For the sake of simplicity, Euler discretization method is used according to certain embodiment of the present disclosure. The discrete state space model can be expressed using $$x^{k+1} = A_d x^k + B_d u^k \tag{7}$$

$$A_d = I + T_s A, \; B_d = T_s B \tag{8}$$

where k denotes the $k^{th}$ sampling step, I is the identity matrix and $T_s$ is a duration time of the sampling steps.

The rotor flux can be estimated from the rotor dynamics expressed at the rotor reference frame as follows.

$$\psi_r + \tau_r \frac{d\psi_r}{dt} = L_m i_s \tag{9}$$

After using Euler discretization, following relation is obtained.

$$\psi_r^k = \frac{L_r}{L_r + T_s R_r} \psi_r^{k-1} + \frac{L_m T_s R_r}{L_r + T_s R_r} i_s^k \tag{10}$$

In deriving the Equation (10), An Euler backward discretization and a recurrence formula on the stator current $i_s$ may be used. Additionally, other equations deal with variables at k, k+1, and k+2 steps. Thus, the left side of Equation (10) may optionally be written by $\psi_r^{k+1}$ with a function of $\psi_r^k$ and $i^{k+1}$.

Knowing the rotor flux and using measured current, Equation (7) can be used to predict rotor flux one-sampling step ahead. Then stator flux can be calculated for the $(k+1)^{th}$ sampling step from:

$$\psi_s^{k+1} = k_r \psi_r^{k+1} + L_\sigma i_s^{k+1} \tag{11}$$

In order to compensate for the time delay caused by calculation process, the variables at the $(k+2)^{th}$ sampling step can be calculated as follows.

$$x^{k+2} = A_d x^{k+1} + B_d u^{k+1} \tag{12}$$

$$\psi_s^{k+2} = k_r \psi_r^{k+2} + L_\sigma i_s^{k+2} \tag{13}$$

$$T^{k+2} = 3/2 n_p(\psi_s^{k+2} \times i_s^{k+2}) \tag{14}$$

It should be noted that the variables in above equations (7) and (11) are expressed in stator reference frame. Therefore, appropriate coordinate transformation should be considered.

In the cost function minimization, a predefined cost function g is evaluated for each of the plurality of CVVs, particularly in a certain embodiment of the present disclosure, for each of the four CVVs constituting the VVG selected, as explained earlier regarding Tables I and II. According to a certain embodiment of the present disclosure, the cost function is defined as a deviation between a reference stator flux vector $\psi_s^{ref}$ and a predicted stator flux vector $\psi_s^{k+2}$ for the $(k+2)^{th}$ sampling step as below:

$$g(V_s^{k+1}) = |\psi_s^{ref} - \psi_s^{k+2}|, \tag{15}$$

where, $V_s^{k+1}$ represents one of the candidate voltage vectors selected at the $(k+1)^{th}$ sampling step. The predicted stator flux vector $\psi_s^{k+2}$ is given by, $$\psi_s^{k+2} = \psi_s^{k+1} + T_s(V_s^{k+1} - R_s i_s^{k+1}). \tag{16}$$

On the other hand, the reference stator flux vector $\psi_s^{ref}$ calculated from below relations using a torque reference $T^{ref}$ and a rotor flux $\psi_r^{k+2}$ at the (k+2) sampling step:

$$T = \frac{3}{2} n_p \lambda \; L_m \; (\psi_r \times \psi_s) \tag{17}$$

$$T^{ref} = \frac{3}{2} n_p \lambda \; L_m \; (\psi_r^{k+2} \times \psi_s^{ref}) \tag{18}$$

$$\psi_s^{ref} = \|\psi_s^{ref}\| \cdot \exp(j \angle \psi_s^{ref}) \tag{19}$$

$$\angle \psi_s^{ref} = -\angle \psi_r^{k+2} + \arcsin\left(\frac{T^{ref}}{\frac{3}{2} n_p \lambda \; L_m \; \|\psi_r^{k+2}\| \|\psi_s^{ref}\|}\right). \tag{20}$$

Lastly, the minimum value of the cost function for the four CVVs given by the VVG selected is determined as follows.

$$V_{opt} = \arg \min_{\{V_g\}} \; g(V_s^{k+1}). \tag{21}$$

Then, a voltage vector corresponding to the minimum value of the cost function, is selected as a primary voltage vector to be applied in the next sample period.

As for a comparison purpose, here a cost function g used in a conventional method is described briefly. For PTC, the main objectives are to minimize torque and flux errors. Thus, the most common approach is to use the weighted sum of torque and flux errors as follows:

$$g = \frac{|T^{ref} - T^{k+2}|}{T_{rated}} + K_\psi \frac{|\|\psi_s^{ref}\| - \|\psi_s^{k+2}\||}{\|\psi_s\|_{rated}}, \quad (22)$$

where $T^{ref}$ and $\psi_s^{ref}$ represent the torque reference and the stator flux reference, respectively, $T_{rated}$ and $\|\psi_s\|_{rated}$ a rated torque and a rated stator flux magnitude, respectively. $K_\psi$ is the flux weighting factor which determines the relative importance of flux error represented by the second term and is a cause that makes calculation process much more time consuming than an approach without the weighting factor according to the present disclosure. During the process of designing the cost function, $K_\psi$ is carefully tuned in order to obtain good performance. One way to accomplish this is to consider a figure of merit like a root mean square (RMS) errors of torque and flux and select a weighting factor compromising both. See, P. Cortes et al.

Figure 2:
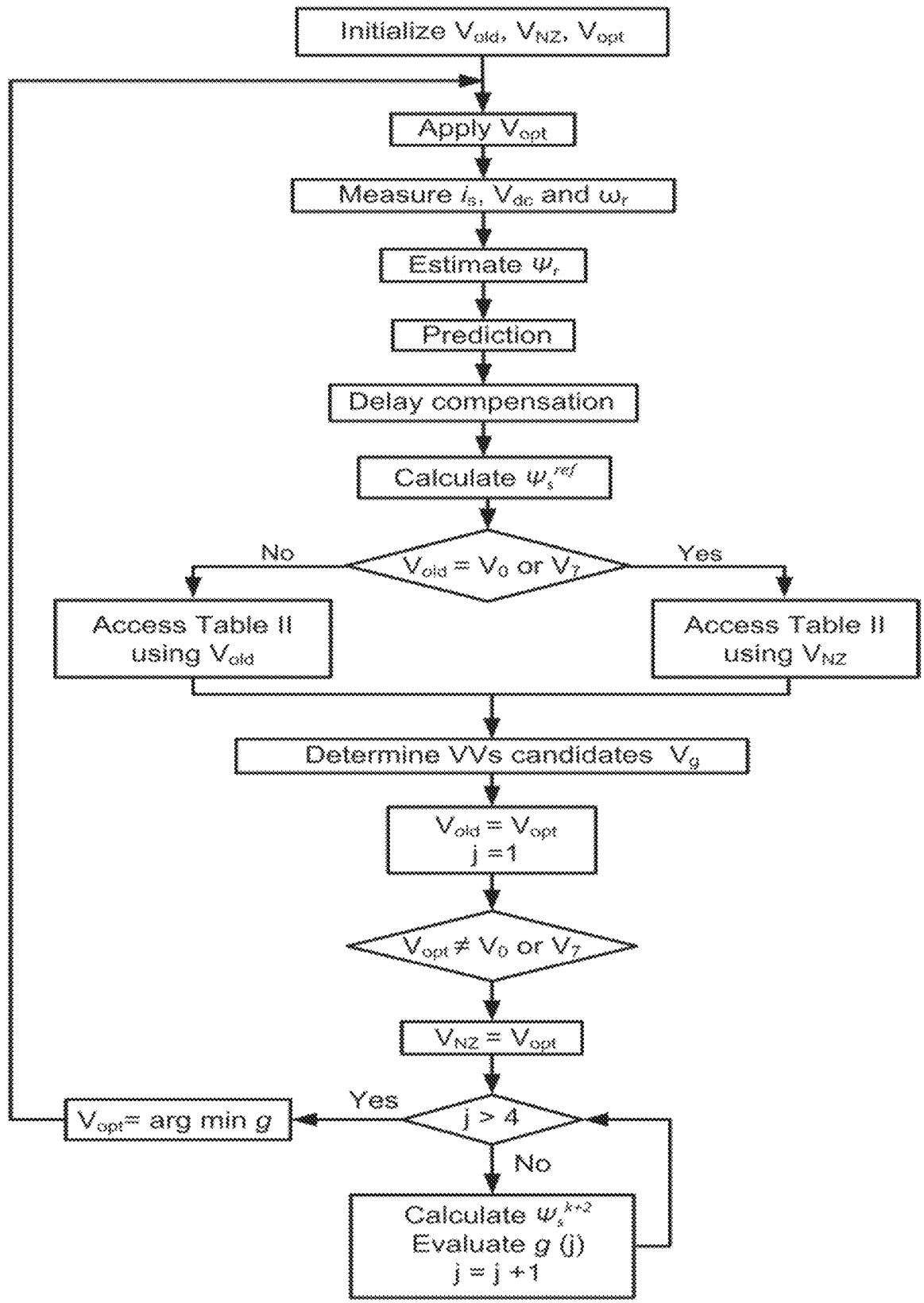
FIG. 2 illustrates an exemplary flow chart of the main steps of a method for controlling the electric drive system according to an embodiment of the present disclosure.

FIG. 2 illustrates an exemplary flow chart of the main steps of a method according to an embodiment of the present disclosure. As above detailed with FIG. 1 and the model equations, the estimation step comprises calculating the control variables based on measured values of the external variables, the stator current, the input voltage supply, and the rotor angular speed. The prediction step comprises calculating control variables in a future sampling step, the control variables including the stator flux reference based on the Torque reference given. The selection of the voltage vector group by referring the Table II based on the $V_{old}$ given by either the initial condition or the previous sampling step, may be performed as the first step of the prediction step. The calculation of the stator flux reference may be performed after the selection of the voltage vector group and in the cost function minimization step, since the calculation requires the rotor flux reference at the future $(k+2)^{th}$ sampling step, which is specific to the candidate voltage vector given by the voltage vector group selected. FIG. 2 may include an additional path as a part of each of the four routines of the cost function minimization step, the path returning to the calculation of the stator flux reference and further returning to the routine. Thus, it should be noted that the flow chart of FIG. 2 illustrates just main steps. It is assumed some additional detailed procedures are taken account into, in a way consistent to the disclosures and implications of above explanation on FIG. 1 and the model equations.

Figure 3:
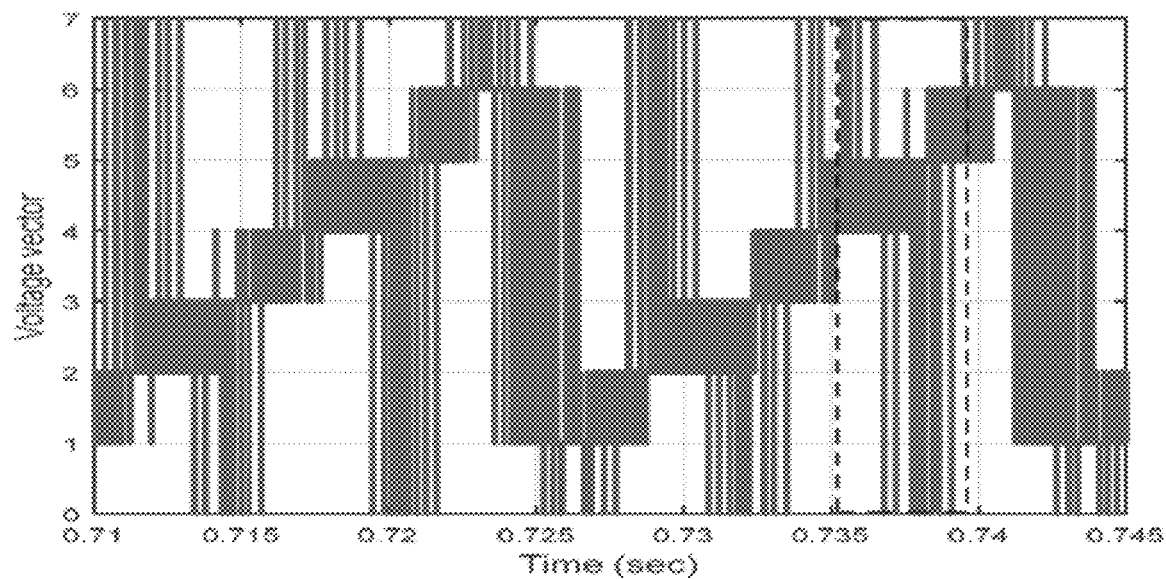
FIG. 3 illustrates exemplary chronological transitions of the primary voltage vector observed in simulations of the electric drive system controlled according to the conventional method.
Figure 3:
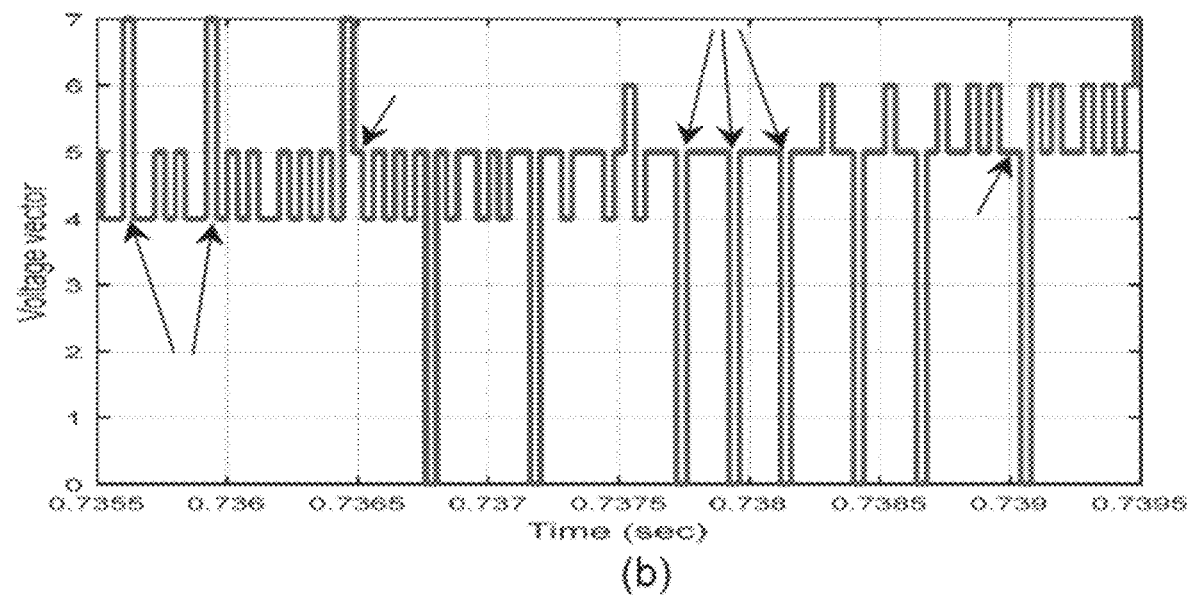

FIG. 3 illustrates exemplary chronological transitions of the primary voltage vector observed in simulations of the electric drive system controlled using a conventional method. Here the vertical axis indicates the primary voltage vector represented by Vn (n=0 to 7). In the conventional method, the eight different possible output VVs of the 2L-VSI are evaluated in every step, and therefore have a possibility to be selected as a primary VV. FIG. 3 (a) indicates that there is a pattern where nonzero VVs ($V_1$ to $V_6$) are changing in a certain sequence. For example, the primary VV changes between $V_1$ and $V_2$ in a period and then in a next period $V_2$ or $V_3$ are always selected as the primary VV and so on. Moreover, this pattern repeats each electric cycle. A further observation is illustrated in FIG. 3 (b) which represents a zoomed view for the period highlighted in FIG. 3 (a). If a previous primary VV was either $V_0$ or $V_7$, there are two possibilities for the next primary VV; either it returns to the last nonzero VV ($V_{NZ}$) or returns to a VV adjacent to the last $V_{NZ}$. Those two cases are pointed by arrows in FIG. 3 (b).

The procedures described regarding Table II for selecting the four candidate voltage vectors correlated exclusively to the given $V_{old}$ or $V_{NZ}$ is based on above features of the primary voltage vector observed in FIG. 3.

TABLE III

INDUCTION MOTOR PARAMETERS

| Parameter | Value | Parameter | Value |
|---|---|---|---|
| $P_r$ | 1 Kw | $Tr_{ated}$ | 5.58 N · m |
| $N_{rated}$ | 1710 rpm | $\|\Psi_s\|_{rated}$ | 0.8157 Wb |
| $R_g$ | 8.15 Ω | $R_r$ | 6.0373 Ω |
| $L_g$ | 0.4577 H | $l_\mu$ | 0.4577 H |
| $L_m$ | 0.4372 H | $n_p$ | 2 |
| J | 0.007 Kg m² | B | 0 N · m · s |

TABLE IV

CONTROLLER PARAMETERS

| Description | Symbol | Value |
|---|---|---|
| Simulation time | $T_{sim}$ | 2.5 μsec |
| PTC Sampling time | $T_g$ | 40 μsec |
| Flux weighing factor | $K_\psi$ | 8 |
| Proportion gain | $K_p$ | 0.63 |
| Integral gain | $K_i$ | 14.17 |

Figure 4:
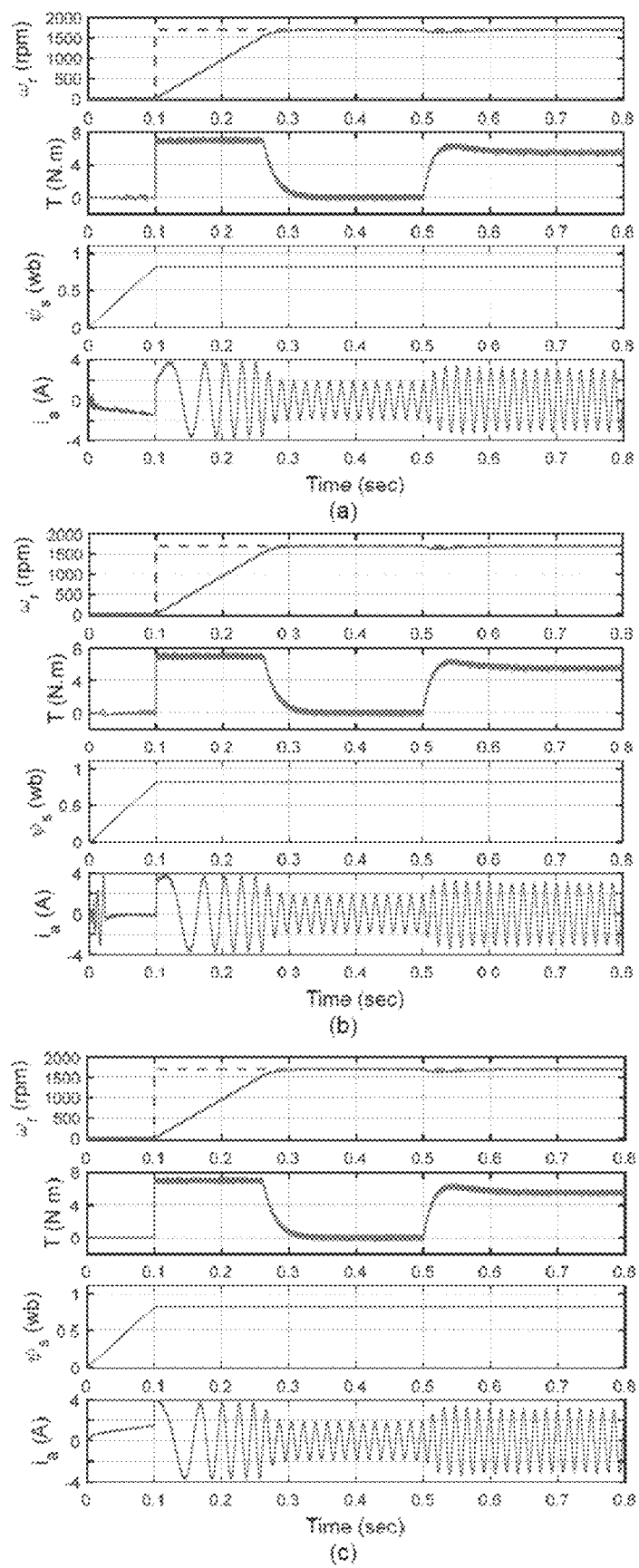
FIG. 4 illustrates exemplary simulation results on dynamic response characteristics of an electric drive system controlled by a) a conventional method with the flux weighting factor, b) a reduced switching frequency (RSF) method with one step prediction, and c) a method according to an embodiment of the present disclosure.

FIG. 4 illustrates exemplary simulation results on dynamic response characteristics of an electric drive system controlled by a) a conventional method with the flux weighting factor, b) a reduced switching frequency (RSF) method with one step prediction, and c) a method according to certain embodiment of the present disclosure. See for detail of the RSF method, for example, F. Wang, Z. Zhang, A. Davari, J. Rodriguez, and R. Kennel, id. For all three methods, rotor angular speed $\omega_r$, torque T, stator flux $\psi_s$ and phase current $i_a$ are illustrated from top to bottom respectively. The MATLAB Simulink was used for the simulation with machine parameters listed in Table III and with controller parameters listed in Table IV. In the simulation, at first the stator flux is built to its rated value 0.815 Wb, and then the rotor angular speed command is applied at t=0.1 sec. This pre-excitation process helps in reducing the starting current. Finally, at t=0.5 sec, rated load 5.58 Nm is applied. The same PI controller gains given in Table IV were used for the outer speed loop for all three methods. The responses of FIG. 4 indicate that the method according to the present disclosure has fast dynamic response and robustness against external load disturbance, and responses are equivalent to those of other two methods.

Figure 5:
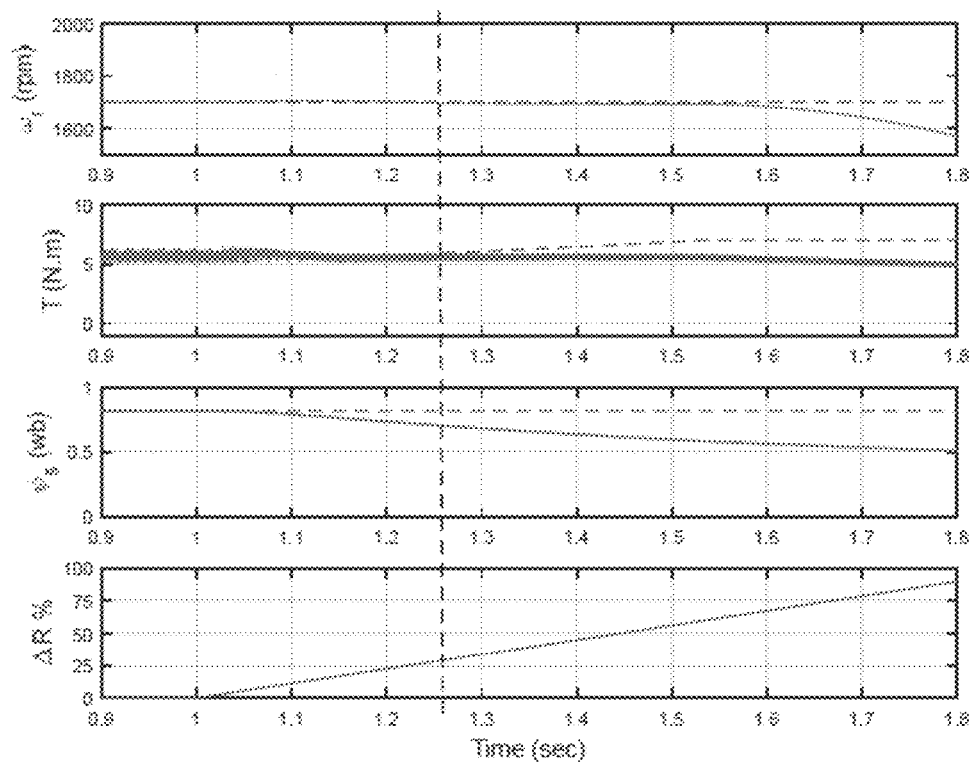
FIG. 5 illustrates exemplary simulation results on the robustness against parameter variations of the electric drive system according to the present disclosure.
Figure 5:
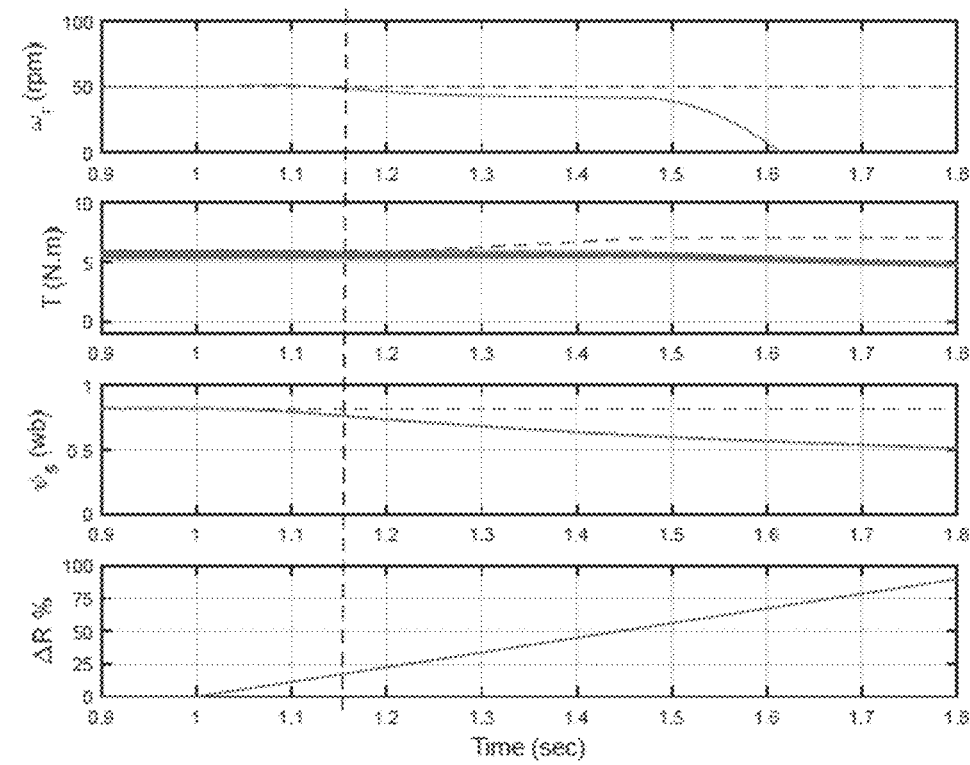

FIG. 5 illustrates exemplary simulation results on the robustness against parameter variations of the electric drive system according to the present disclosure. Here, system responses were simulated by increasing both the stator resistance and rotor resistance as indicated at bottom by an increase amount ΔR (%), under a rated load of 5.58 Nm and at (a) rated rotor angular speed of 1710 rpm, or at (b) low rotor angular speed of 50 rpm. As indicated by the dashed vertical line criteria over which the controller starts to fail in stabilizing the system, the system response is satisfactory under the increase of both stator resistance and rotor resistance up to 129% at (a) the rated rotor angular speed and up to 117% at (b) very low rotor angular speed of 50 rpm.

Figure 6:
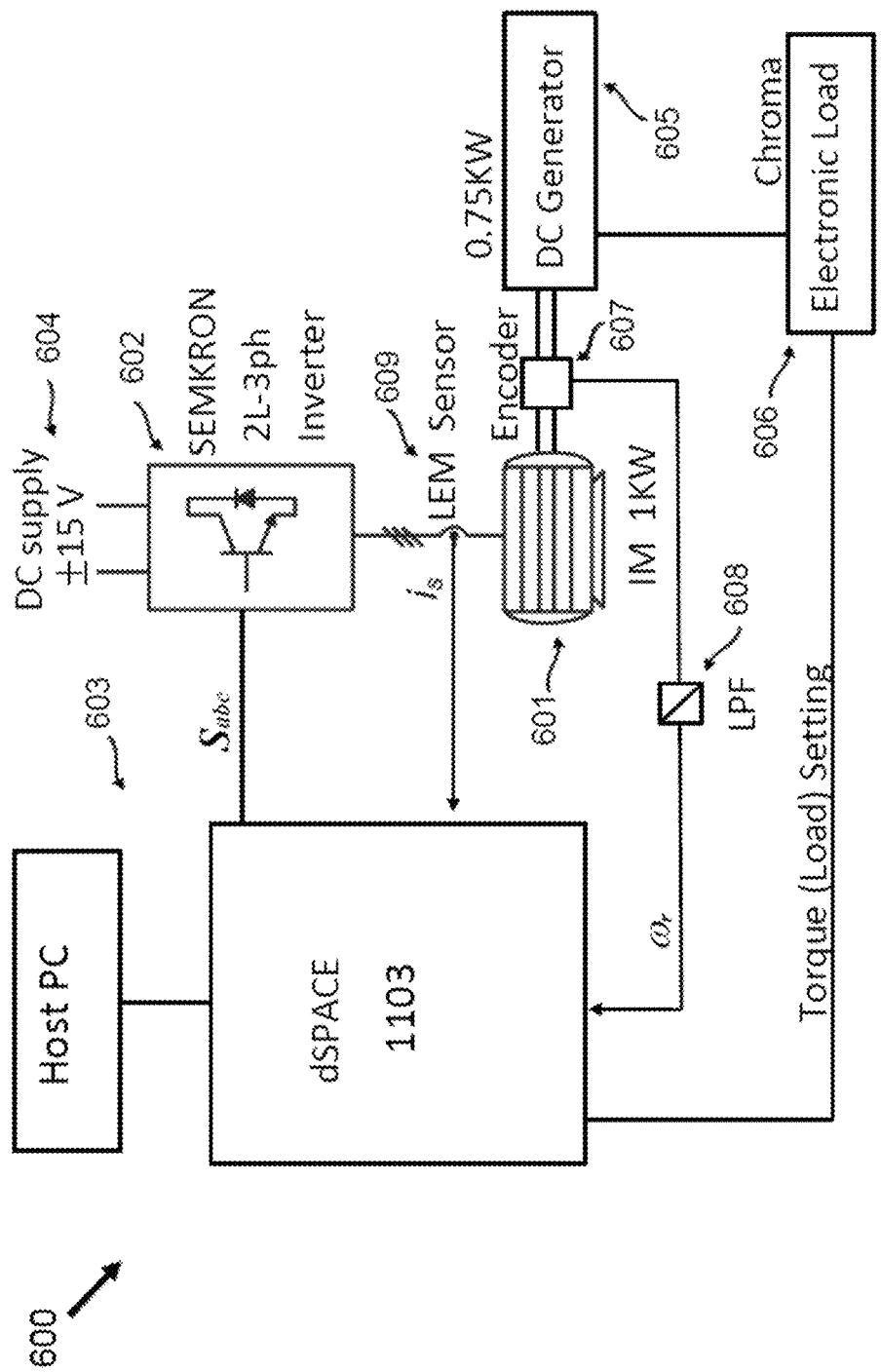
FIG. 6 illustrates a schematic block diagram of an experimental set up to demonstrate the dynamic capability of an electric drive system and a method according to an embodiment of the present disclosure compared with the conventional approach.

FIG. 6 illustrates a schematic block diagram of an experimental set up to demonstrate the dynamic capability of an electric drive system and a method according to certain embodiment of the present disclosure compared with the conventional approach. The experimental set up was constructed based on FIG. 1 as follows. An induction motor 601 with 1.0 kW output power having the same parameters as in Table III is mechanically coupled to a 0.75 kW separately excited DC generator 605, where the terminal of the DC generator 605 is connected to a Chroma programmable electronic load 606 to give a controlled load to the induction motor 601. The induction motor 601 is fed by a controlled 2L-VSI from SEMKRON 602 connected with ±15 V DC supply 604. The controlling algorithm described in FIGS. 1 and 2 is implemented in real time using dSPACE 1103 (1 GHz) platform and a host computer 603. The sampling time for all the algorithms is set to 40 μsec. The rotor angular speed is measured using a 1024 pulse per revolution incremental encoder 607 and a low pass filter 608 is adopted to reduce the quantization error. The stator current is measured by an LEM sensors 609.

Figure 7:
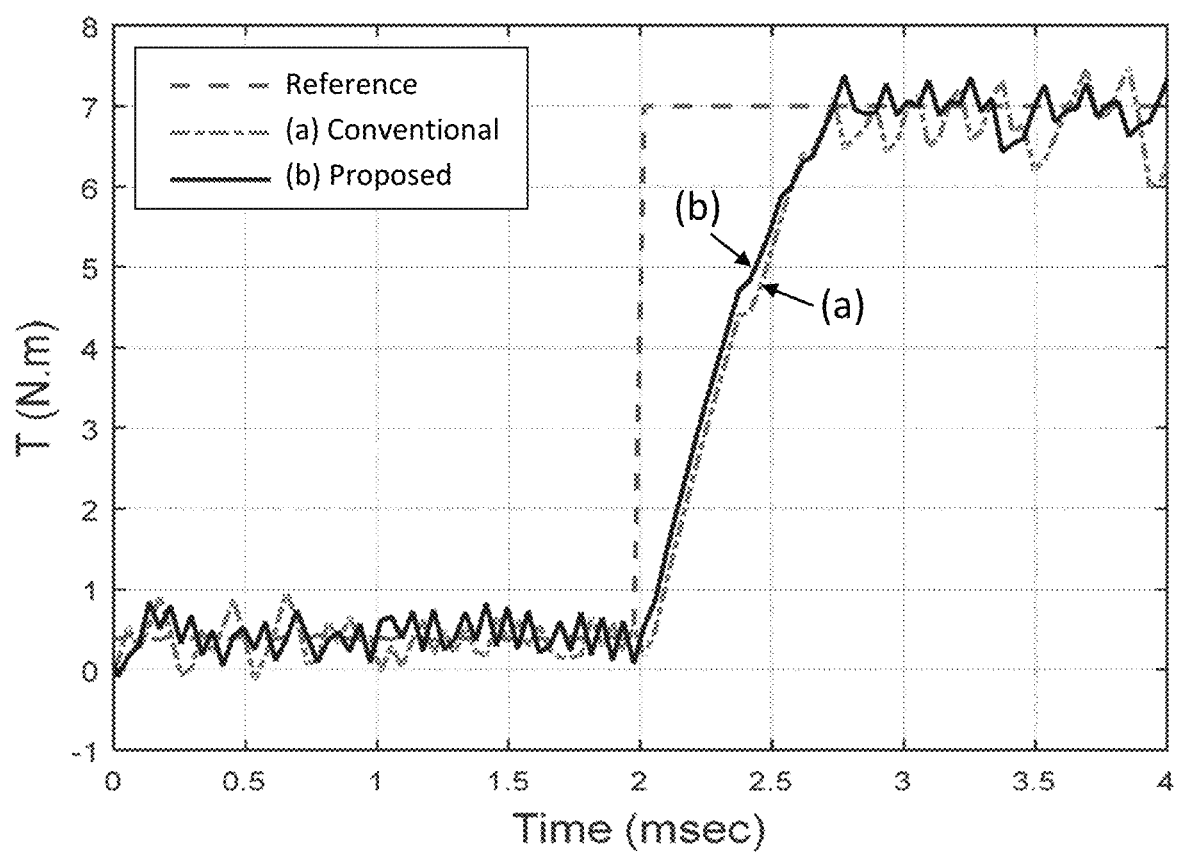
FIG. 7 illustrates exemplary experimental dynamic torque response of an electric drive system controlled by (a) the conventional method, and (b) a method according to an embodiment of the present disclosure.

FIG. 7 illustrates exemplary experimental dynamic torque response of an electric drive system controlled by (a) the conventional method, and (b) the method according to certain embodiment of the present disclosure. In the experiments, in order to demonstrate torque dynamic characteristics, a step change in the rotor angular speed command from 1000 to 1400 rpm was applied. This results in saturating the PI controller and causing the torque command to step to its maximum value. Results compared here demonstrate that the dynamic torque response of the system according to the certain embodiment of the present disclosure does not degrade compared to the conventional method, since the two systems both reach the new reference rotor angular speed with an equivalent delay time less than one msec.

Figure 8:
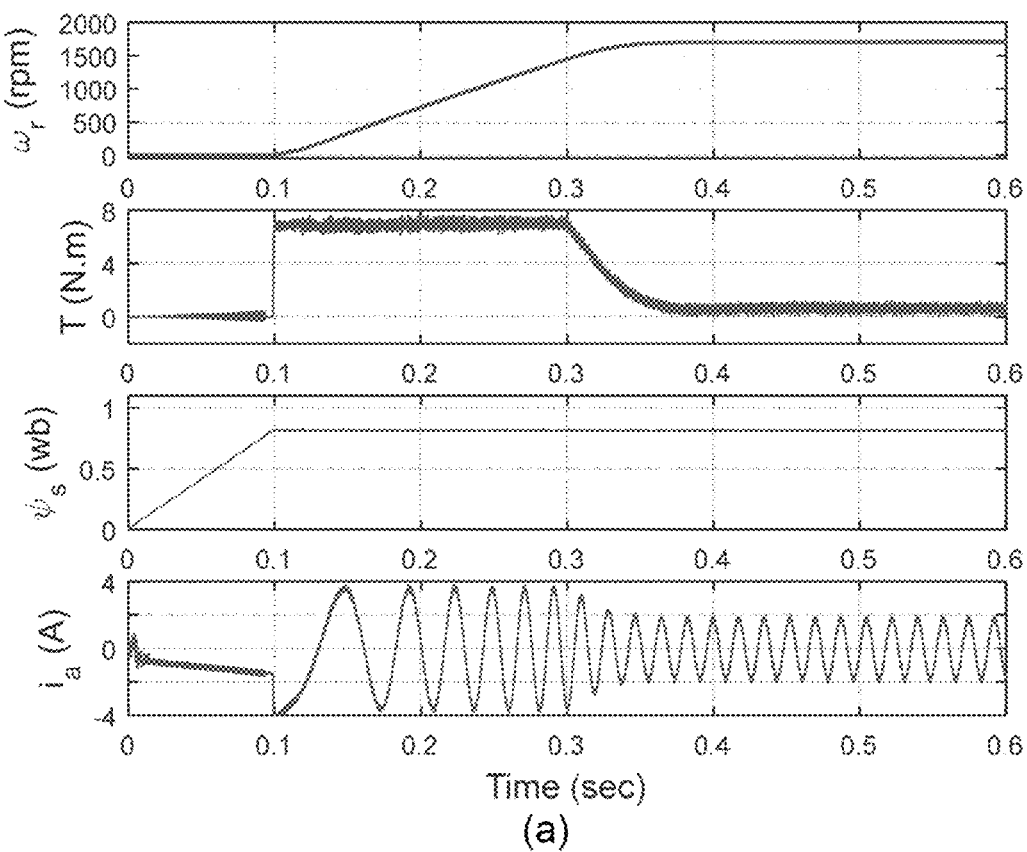
FIG. 8 illustrates exemplary experimental results on starting response from zero to the rated rotor angular speed for an electric drive system controlled by (a) the conventional method and (b) a method according to an embodiment of the present disclosure.
Figure 8:
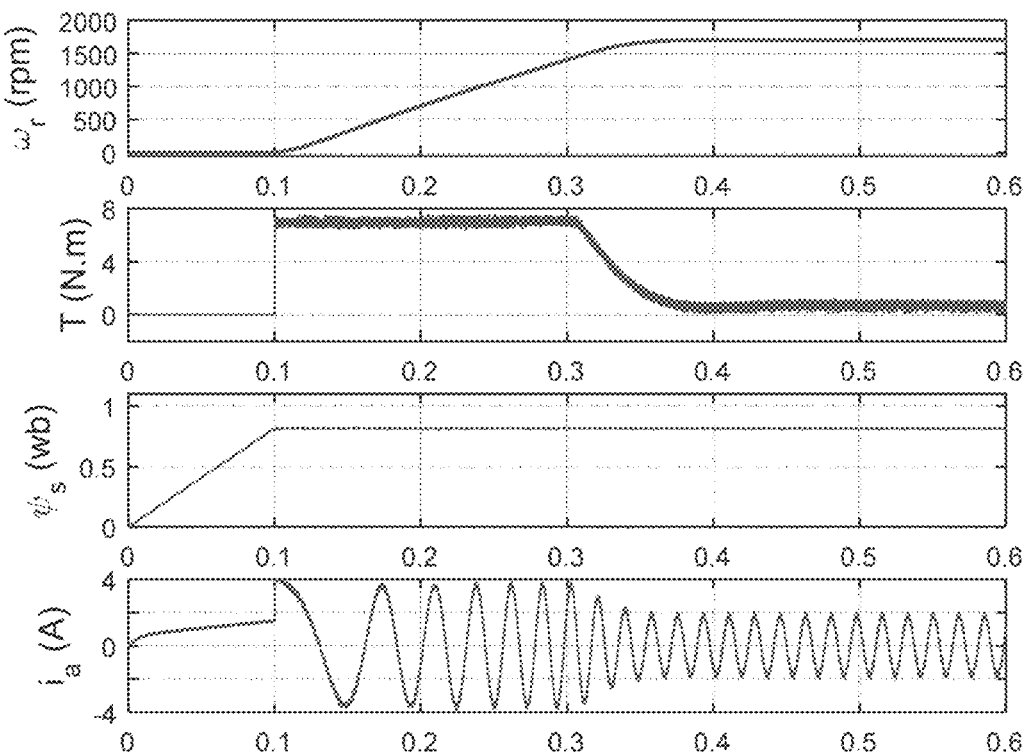

FIG. 8 illustrates exemplary experimental results on starting response from zero to the rated rotor angular speed for an electric drive system controlled by (a) the conventional method and (b) the method according to certain embodiment of the present disclosure. The experiments were performed as follows. The same pre-excitation process as depicted in FIG. 4 is used: at first, the stator flux is built to the rated value 0.815 Wb, then the rotor angular speed command of the rated rotor angular speed 1710 rpm is applied at t=0.1 sec. As confirmed here, both systems reached the rated rotor angular speed with almost the same transient time of 0.25 sec, exhibiting equivalent starting responses. FIG. 8 also shows that a decoupled control of torque and stator flux is achieved in the system according to certain embodiment of the present disclosures in the same way as in the conventional system. These results demonstrate that the system according to certain embodiment of the present disclosure can achieve the same performance as of the conventional system, with a benefit of simpler cost function design attributed to the elimination of the flux weighting factor.

Figure 9:
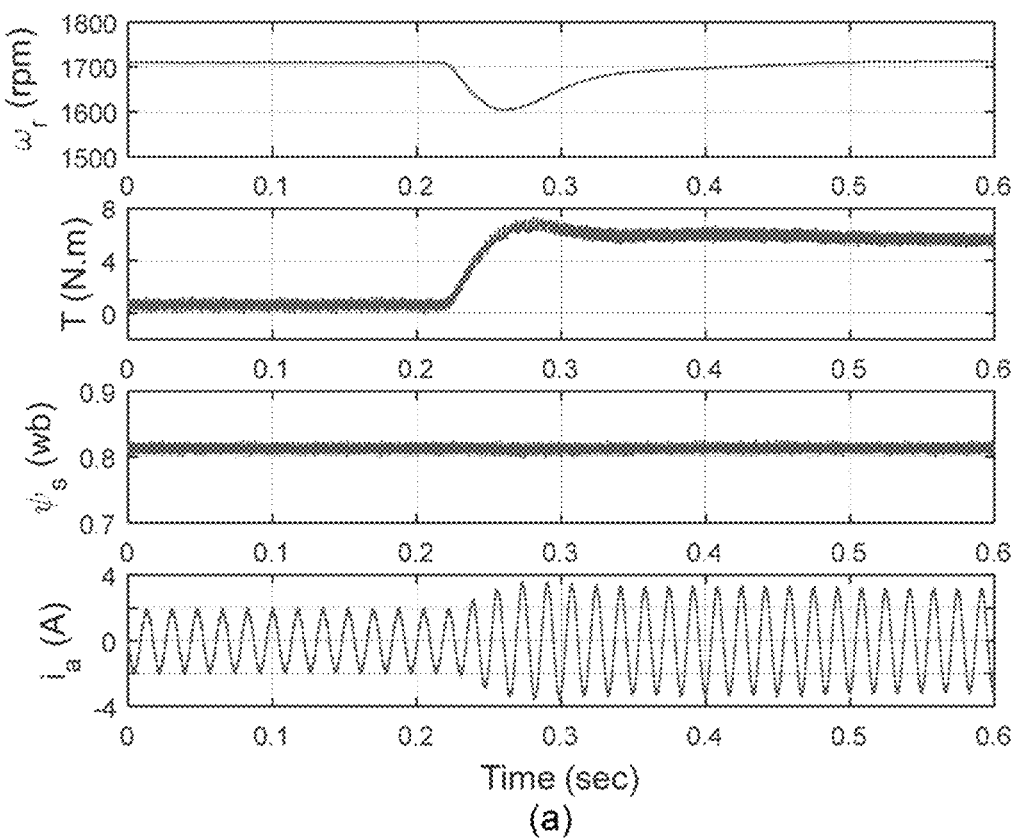
FIG. 9 illustrates exemplary experimental results on sudden loading response for an electric drive system controlled by (a) the conventional method and (b) a method according to an embodiment of the present disclosure.
Figure 9:
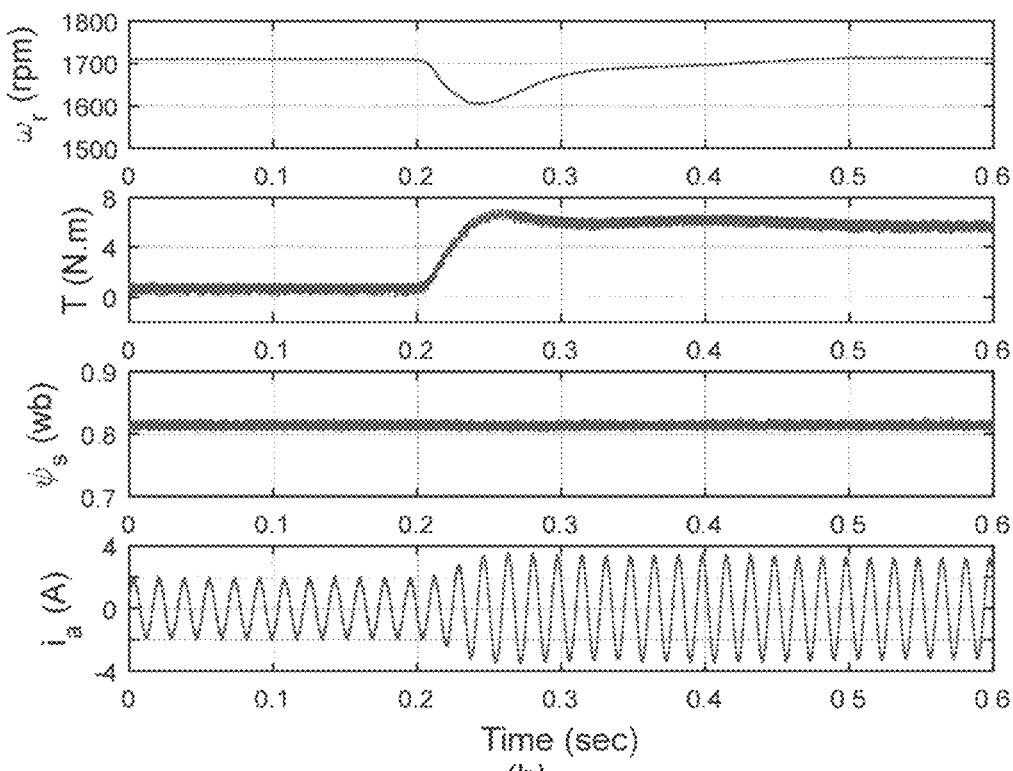

FIG. 9 illustrates exemplary experimental results on sudden loading response for an electric drive system controlled by (a) the conventional method and (b) the method according to certain embodiment of the present disclosure. Experiments were performed in order to test the robustness against a sudden external load as follows: while running without a load and at the rated rotor angular speed of 1710 rpm as a reference rotor angular speed, the rated load 5.58 Nm is suddenly applied to the motor at a time 0.2 sec. As observed here, the system according to certain embodiment of the present disclosure successfully regains the reference rotor angular speed after a short transient period equivalent to one of the conventional system proving its robustness against load disturbance.

Figure 10:
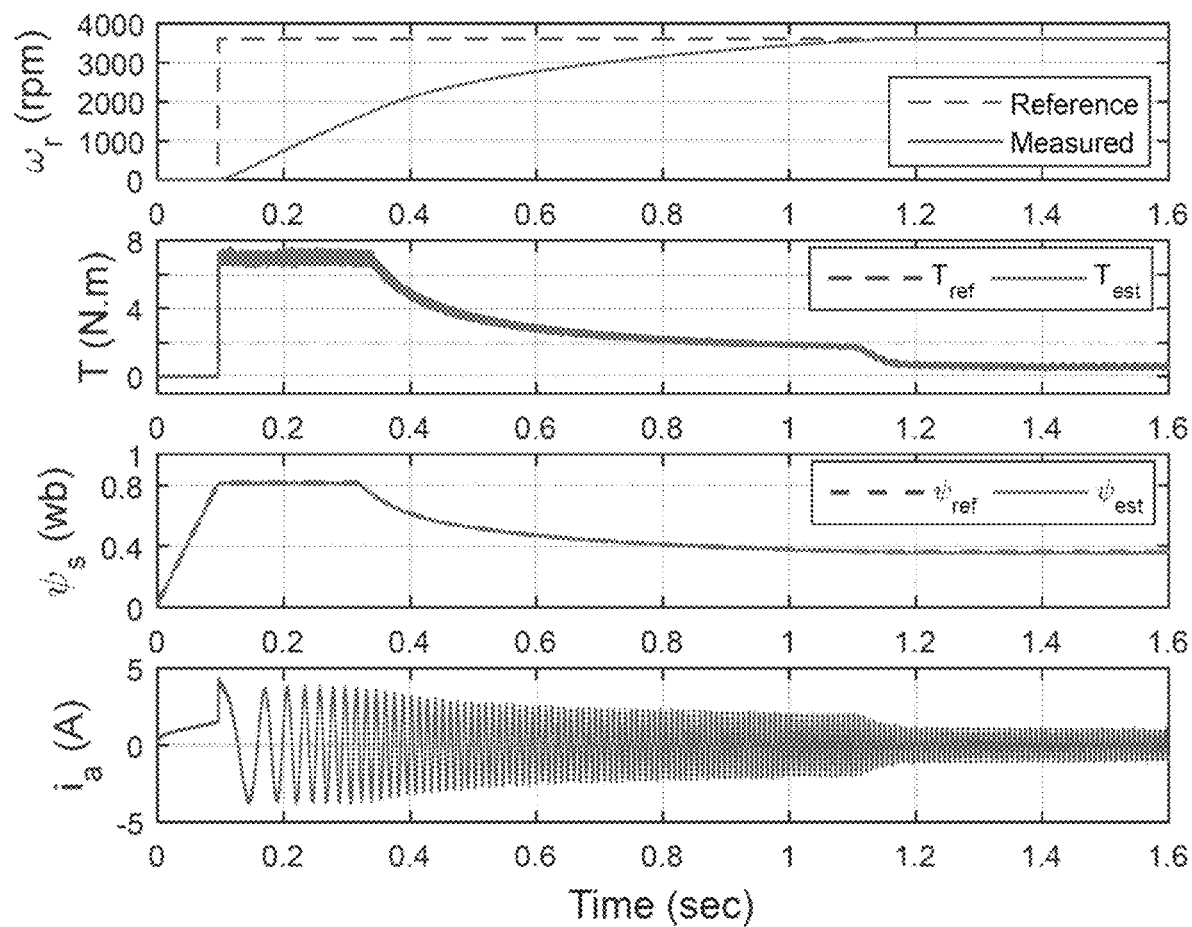
FIG. 10 illustrates exemplary experimental results on starting response from zero to a very high rotor angular speed region for the system according to certain embodiment of the present disclosure.

FIG. 10 illustrates exemplary experimental results on starting response from zero to a very high rotor angular speed region for the system according to certain embodiment of the present disclosure. Experiments were performed in order to test performance at very high rotor angular speed and hence field weakening region as follows: the motor is commanded to start from standstill to accelerate to the rotor angular speed of 3600 rpm without a load. Up to the rated rotor angular speed of 1710 rpm, the stator flux is set to its rated value. For rotor angular speed higher than the rated rotor angular speed, the stator flux command is varied inversely to the rotor angular speed and the maximum torque is varied in proportion to square of the reference flux. The torque response and the stator flux response observed here demonstrate that both of them track their references perfectly even in the field weakening region when both of the stator flux and the torque references are varying simultaneously.

Figure 11:
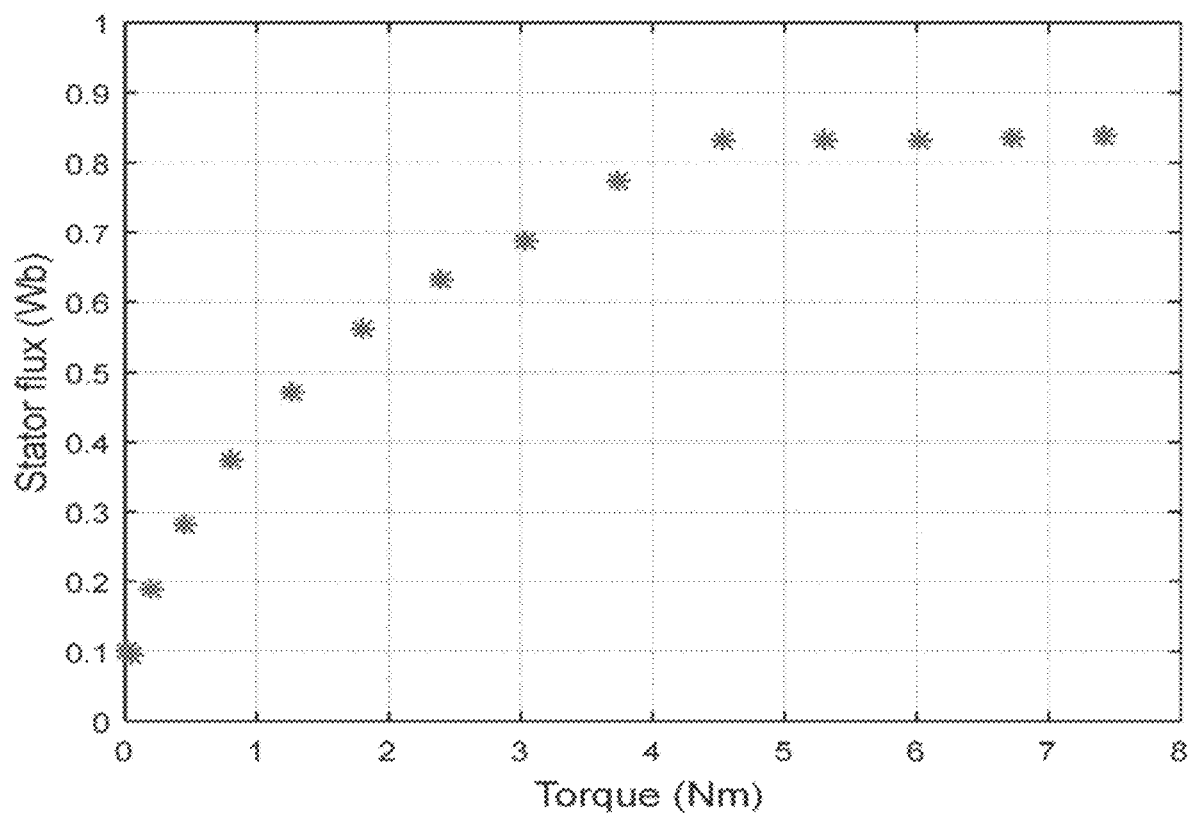
FIG. 11 illustrates exemplary calculated results on a relation between the stator flux reference and the torque reference for the system and the method according to certain embodiment of the present disclosure under maximum torque per ampere (MTPA) criteria.

FIG. 11 illustrates exemplary calculated results on a relation between the stator flux reference and the torque reference for the system and the method according to certain embodiment of the present disclosure under maximum torque per ampere (MTPA) criteria. The MTPA criteria is achieved by minimizing the stator current magnitude for a given torque and rotor angular speed conditions. Thus, the MTPA algorithm is known as an approach to reduce power consumption of induction motor. In order to maintain minimum stator current, the IM needs to operate at a slip frequency which is equal to the inverse rotor time constant:

$$\omega_s = \frac{R_r}{L_r} = \frac{1}{\tau_r}, \tag{22}$$

where $\tau_r$ is the rotor time constant. As clearly indicated here in FIG. 11, the stator flux and the torque are related unambiguously under MTPA method, the minimum value of the stator flux is set to 0.1 Wb at zero torque to avoid excessive flux reduction, and the value of the stator flux saturates at its rated value of 0.82Wb, due to limitation of direct axis current. This relation between the stator flux and the torque under the MTPA criteria can be used as a lookup table to generate the reference stator flux based on the reference torque. See, R. Bojoi, Z. Li, S. A. Odhano, G. Griva, and A. Tenconi, "Unified direct-flux vector control of induction motor drives with maximum torque per ampere operation," *IEEE Energy Conversion Congress and Exposition*, ECCE 2013, 2013, pp. 3888-3895, the entire contents of which are herein incorporated by reference.

Figure 12:
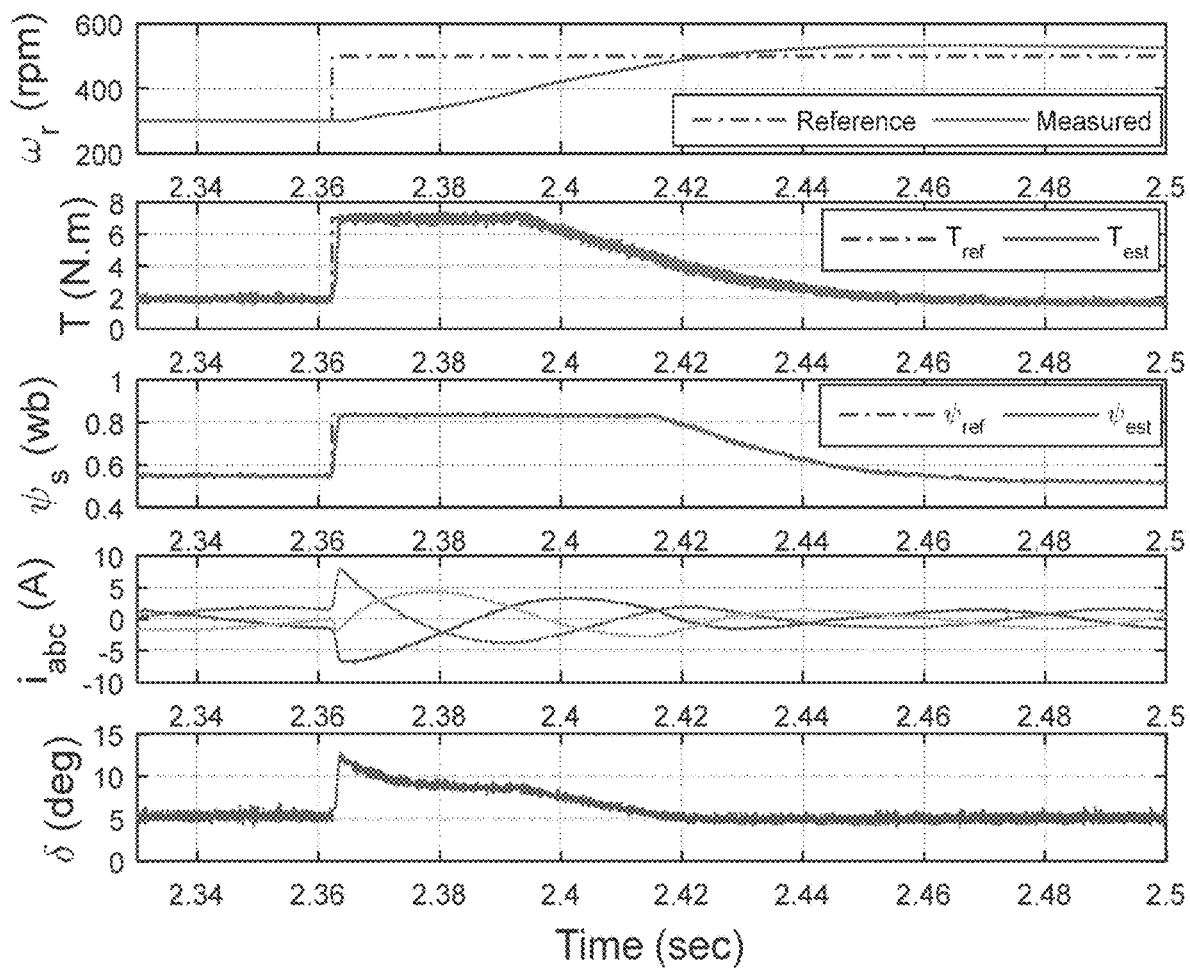
FIG. 12 illustrates exemplary experimental results on response of the system according to certain embodiment of the present disclosure under maximum torque per ampere (MTPA) method.

FIG. 12 illustrates exemplary experimental results on response of the system according to certain embodiment of the present disclosure under maximum torque per ampere (MTPA) method. Experiments were performed as follows: the reference rotor angular speed is given a stepwise change from 300 to 500 rpm with a load of 2 Nm in order to apply a step torque command. The operating rotor angular speeds have been selected such that the operation will be in stator flux increase region in FIG. 11 and there will be feasible voltage vector capable of tracking torque and stator flux references. The results here can be explained as follows. The stepwise change of the reference rotor angular speed will saturate the outer speed controller and the reference torque will reach its maximum value with stepwise increase. Since the stator flux and torque are related one to one as illustrated in FIG. 11 under MTPA method, a stepwise change in the stator flux reference occurs. The results demonstrate that both the stator flux and torque track their references almost completely with very fast dynamics. Moreover, it is also confirmed that the current response is limited within acceptable range. Even though there is no direct limitation on the current in the proposed method, the current will be bounded due to the limitation on the machine torque and the stator flux. The variation of the load angle δ(deg) is illustrated at the very bottom curve of FIG. 12. It is clear that the load angle is less than 45 deg, which guarantees stable operation and that the maximum slip will not be exceeded.

Figure 13:
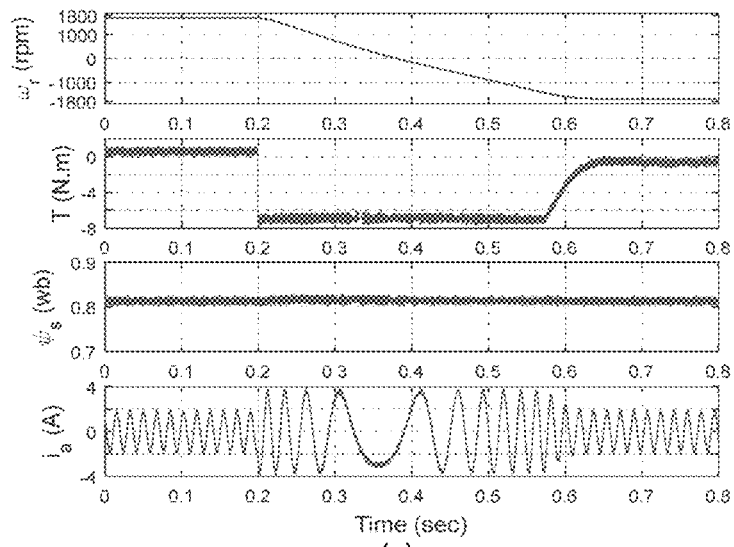
FIG. 13 illustrates exemplary experimental results of a rotor angular speed reversal test for the electric drive system controlled by (a) the conventional method, (b) the RSF method, and (c) the method according to certain embodiment of the present disclosure.
Figure 13:
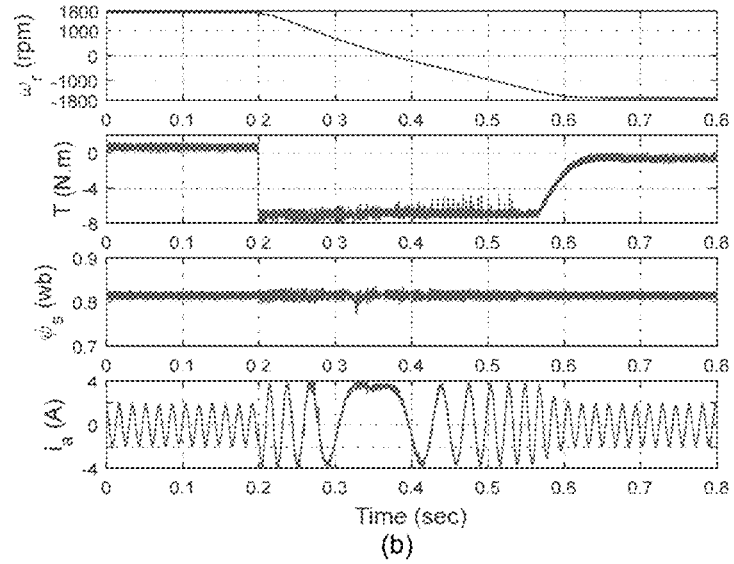
Figure 13:
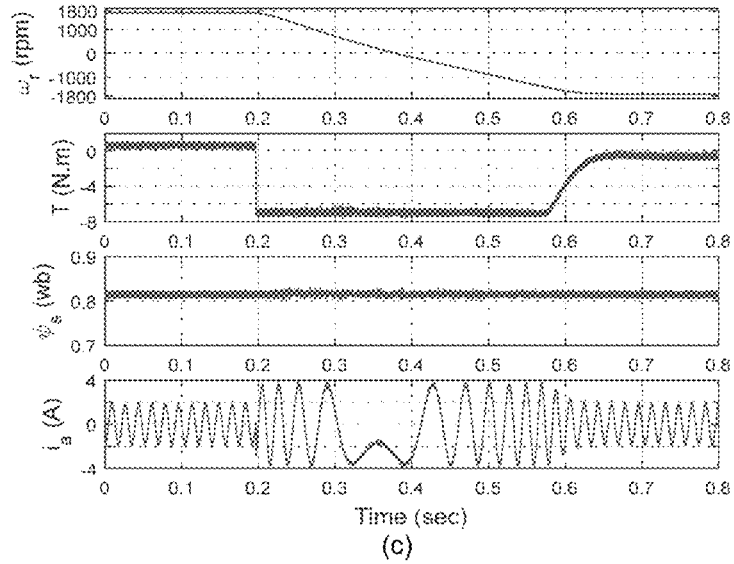

FIG. 13 illustrates exemplary experimental results of a rotor angular speed reversal test for the electric drive system controlled by (a) the conventional method, (b) the RSF method, and (c) the method according to certain embodiments of the present disclosure. The rotor angular speed reversal from 1710 to −1710 rpm was tested at no-load, at the rated stator flux condition. The system of certain embodiment according to the present disclosure as well as the conventional system demonstrates that the stator flux is fixed to its rated value during all the transient period in spite of the large variation of the torque, proving the decoupled effect between the stator flux and torque control. On the other hand, the stator flux ripple, the torque ripple, and the current distortion increase significantly with the RSF method. Similar response was reported for the RSF method. This indicates that the RSF cannot work properly at low rotor angular speed and high torque operating point where further tuning for the flux-weighting factor is required. On the other hand, the torque ripple in the system according to certain embodiments of the present disclosure is within acceptable range. This improvement is attributed to the present approach of eliminating the weighting factor from the cost function definition. This approach automatically compromises errors between the torque and the stator flux, in contrast to the fixed flux-weighting factor used for both RSF and the conventional method.

Figure 14:
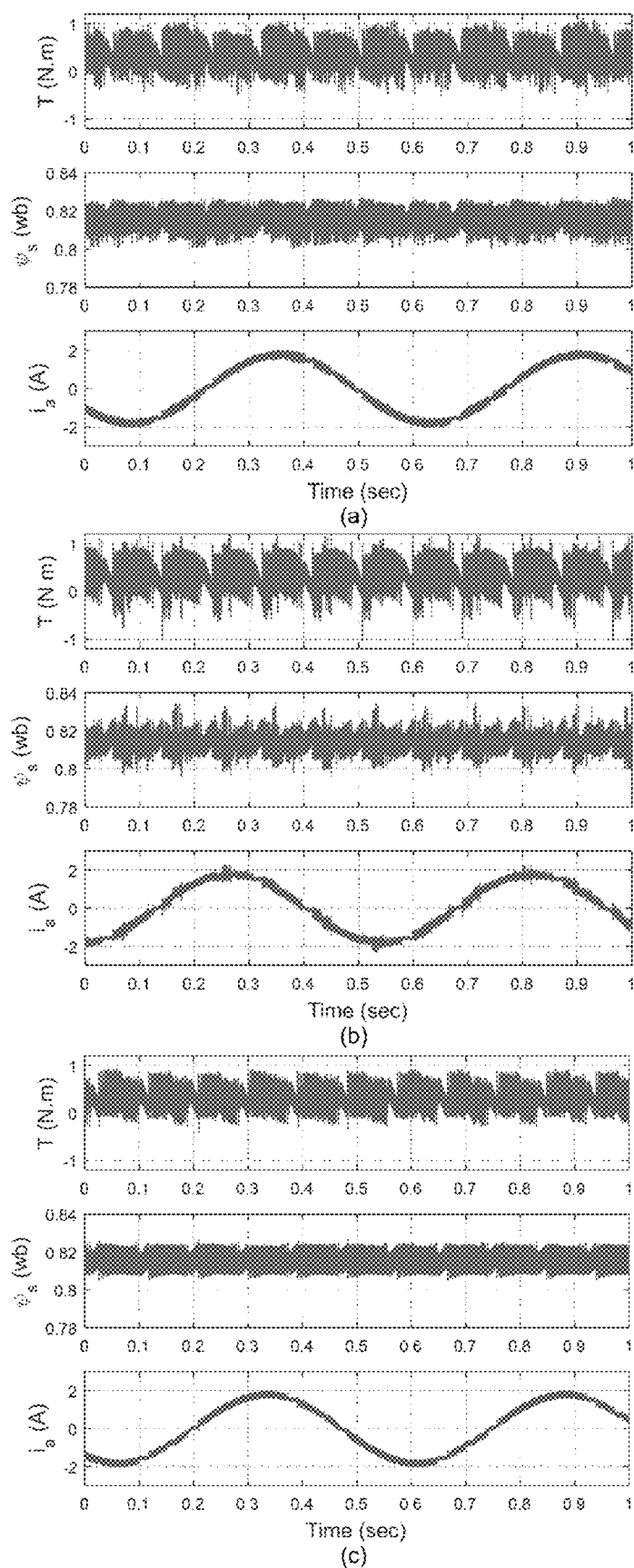
FIG. 14 illustrates exemplary steady state operation characteristics at a low rotor angular speed for the electric drive system controlled by (a) the conventional method, (b) RSF method, and (c) the method according to certain embodiment of the present disclosure.

FIG. 14 illustrates exemplary steady state operation characteristics at a low rotor angular speed for the electric drive system controlled by (a) the conventional method, (b) RSF method, and (c) the method according to an embodiment of the present disclosure. At steady state condition with low rotor angular speed of 50 rpm and no-load, stability of the torque, the stator flux and the stator current were observed. The results clearly demonstrate that the RSF (b) has the worst stability with the highest torque ripple and most distorted current waveform. The system according to an embodiment of the present disclosure (c) has lower torque ripple and flux ripple than those of the conventional system. In addition, the current waveform in (c) is uniform and sinusoidal unlike the distorted waveform, which is observed in (b) for the RSF system current waveform.

Table V compares steady state characteristics at various rotor angular speed conditions for (a) the conventional system, (b) RSF system, and (c) the system according to an embodiment of the present disclosure (denoted "Proposed" in Table V and hereafter.) In order to cover different operating points, the steady state characteristics were recorded at conditions with different rotor angular speeds and with 2.5 Nm load. Torque ripple $T_{rip}$, flux ripple $\psi_{rip}$, average switching frequency $f_{av}$ and current total harmonic distortion (THD) $i_{THD}$ calculated are listed in Table V.

TABLE V

PERFORMANCE COMPARISON AMONG THREE PTC METHODS AT 2.5 NM

| N (rpm) | Method | $T_{rip}$ (Nm) | $\Psi_{rip}$ (wb) | $f_{av}$ (KHz) | $i_{THD}$ % |
|---|---|---|---|---|---|
| 300 | Conv | 0.813 | 0.012 | 4.24 | 6.93 |
|  | RSF | 0.895 | 0.019 | 2.31 | 9.69 |
|  | Proposed | 0.761 | 0.014 | 2.53 | 7.26 |
| 600 | Conv | 0.718 | 0.012 | 5.50 | 6.36 |
|  | RSF | 0.789 | 0.017 | 2.89 | 9.91 |
|  | Proposed | 0.621 | 0.015 | 4.13 | 6.99 |
| 1000 | Conv | 0.807 | 0.012 | 5.11 | 6.15 |
|  | RSF | 0.775 | 0.018 | 3.52 | 10.38 |
|  | Proposed | 0.646 | 0.013 | 4.44 | 6.64 |
| 1400 | Conv | 0.724 | 0.012 | 3.76 | 6.42 |
|  | RSF | 0.711 | 0.014 | 3.34 | 8.59 |
|  | Proposed | 0.573 | 0.013 | 3.49 | 6.63 |
| 1710 | Conv | 0.703 | 0.013 | 2.67 | 7.71 |
|  | RSF | 0.665 | 0.012 | 2.66 | 7.21 |
|  | Proposed | 0.618 | 0.011 | 2.54 | 6.95 |

In Table V, the third column clearly indicates that the system of the present disclosure is superior to other two approaches regarding the torque ripple $T_{rip}$ (Nm) for all the rotor angular speed regions tested. On the other hand, the RSF method has larger torque ripples than those of the system of the present disclosure for all the rotor angular speed regions tested and the largest torque ripple at lower rotor angular speed region less than 600 rpm.

The flux ripple $\psi_{rip}$ values of the system of the present disclosure is comparable to the conventional systems although the system of the present disclosure exhibits a slight increase at most of the rotor angular speed regions. However, it is still lower than the values of the RSF system which exhibits the worst flux ripple values among the three approaches.

For the averaged switching frequency $f_{av}$ listed in the fifth column in Table V, both the system of the present disclosure and the RSF system exhibit lower, namely, improved values than those of the conventional system. This improvement is attributed to the design of the system of the present disclosure and the RSF system. So far, the reduction of the torque ripple and the flux ripple are quite evident for the system of the present disclosure, although there is a slight increase in the average switching frequency $f_{av}$.

The current THD values for the three approaches are compared in the last column in Table V. The system of the present disclosure exhibits the current THD values a little higher than those for the conventional system. This can be explained as a result of trade-off between the current THD and the average switching frequency. Namely, the increase in the current THD is due to the reduction of $f_{av}$ in the system of the present disclosure from the values for the conventional system. Notably, the RSF system exhibits the worst current THD among the three approaches. It can be explained partly also as a result of the trade-off due to the large reduction of the average switching frequency $f_{av}$ n the RSF system, and partly due to the worst flux ripple values as observed in Table V.

TABLE VI

COMPUTATION TIMES FOR DIFFERENT PTC METHODS

| Method | Pred &opt (μsec) | Total (μsec) |
|---|---|---|
| Conventional | 1.9 | 10.3 |
| RSP | 1.23 | 9.51 |
| Proposed | 1.56 | 9.87 |

Table VI compares average execution time for (a) the conventional system, (b) RSF system, and (c) the system according to an embodiment of the present disclosure. Since the three approaches differ only in the prediction and identification steps, only a sum of times (Pred & opt) for the prediction step and the identification step and a total execution time (Total) are compared here. As observed here, the conventional system has the longest execution time as naturally due to the seven iterations required to finish the prediction and identification steps. The RSF system has the shortest execution time since it need to repeat the prediction and identification steps four times only. Although the system of the present disclosure needs also four iterations for prediction and identification, it has a slight longer execution time compared to the RSF system. This is due to the time required for reference flux vector calculation, which is necessary for eliminating the need for flux weighting factor. However, the execution time is still less than that of the conventional system as indicated in Table VI. Actually, about 18% reduction in the execution time can be achieved using the system of the present disclosure or the method according to an embodiment of the present disclosure, compared to the conventional one. The results of Table V and VI show clearly the efficiency of the proposed method and its ability to compromise among different figure of merits.

A system or a method according to an embodiment of the present disclosure includes salient features over the conventional approaches. The present disclosure describes a system and a method with a simple and an efficient predictive torque control (PTC) algorithm for an electric drive. The system and the method eliminate the need for the flux weighting factor used in the conventional PTC. As a result, tedious offline tuning of the flux weighting factor is no longer required. At the same time, the relative importance between torque and flux ripples are determined in an online fashion. Moreover, unlike the conventional method which needs to evaluate the cost function seven times (for two level three phase inverter case), the system and the method according to embodiments of the present disclosure need only to test four voltage vectors (VVs) at each control sample which leads to a significant reduction in the computation time and switching frequency without sacrificing performance. Simulation and experimental results demonstrated clearly the superiority of the system and the method according to the present disclosure at different operating conditions. The superiority includes lower torque ripple and lower average switching frequency, and shorter execution time. Further the system and method according to embodiment of the present disclosure demonstrated that combination with the MTPA algorithm is feasible, and that therefore also applicable for purposes of reducing power consumption.

Obviously, numerous modifications and variations are possible in light of the above disclosures. Thus, the foregoing discussion discloses and describes merely exemplary embodiments. As will be understood by those skilled in the art, the present disclosures may be embodied in other specific forms without departing from the spirit or essential characteristics thereof. The method and algorithms described herein may be performed in hardware or software executed by hardware, including computer processors and/or programmable circuits configured to execute program code and/or computer instructions to execute the method and algorithms described herein. Additionally, an implementation may be performed on modules or hardware not identical to those described.

Accordingly, the present disclosure is intended to be illustrative, but not limiting of the scope of the disclosures, as well as other claims. The disclosure, including any readily discernible variants of the teachings herein, define, in part, the scope of the foregoing claim terminology such that no inventive subject matter is dedicated to the public.

The invention claimed is:

1. A method for controlling an electric drive system, the electric drive system comprising an induction motor (IM), a power converter configured to convert a DC input voltage to three phase outputs through a two level-voltage source inverter (2L-VSI), and a controller configured to control the power converter, the method comprising:
predefining an initial condition as a voltage vector specifying a switching state of the 2L-VSI;
predefining a lookup table, the lookup table comprising a correlation between a nonzero voltage vector and a voltage vector group, the voltage vector group comprising four candidate voltage vectors (CVVs) and being correlated with the nonzero voltage vector exclusively, wherein
the nonzero voltage vector represents one of six possible switching states of the 2L-VSI with on state for at least one of but not all of the three phase outputs,
the lookup table defines the correlation between the nonzero voltage vector and the voltage vector group for all six possible cases of the nonzero voltage vector, and
the four CVVs for a voltage vector group are generated by allowing at most one component change to three components of the nonzero voltage vector, and
wherein the plurality of CVVs used in the step of predicting a future state variable is selected by referring to the lookup table and identifying a voltage vector group corresponding to a nonzero voltage vector given, wherein the nonzero voltage vector is given by:
a) the primary voltage vector, when the primary voltage vector was the nonzero voltage vector; or
b) a last appeared nonzero voltage vector, when the primary voltage vector was not the nonzero voltage vector; then
applying a primary voltage vector as the switching state of the 2L-VSI, wherein the primary voltage vector is given
a) by the initial condition when a current $k^{th}$ sampling step is a first sampling step, that is k=1, or
b) by a primary voltage vector determined in a previous sampling step when the current $k^{th}$ sampling step is not the first sampling step, that is k>1;
measuring an external variable of the current $k^{th}$ sampling step after applying the primary voltage vector, the external variable comprising a rotor angular speed and a stator current;
estimating a control variable for the current $k^{th}$ sampling step based on a mathematical model and by adopting the external variable measured, wherein the control variable comprises a stator flux and a rotor flux;
predicting a control variable for a future sampling step for each of a plurality of candidate voltage vectors (CVVs) based on the mathematical model and the control variable estimated for the current sampling step, the control variable for the future sampling step comprising a predicted stator flux and a reference stator flux,
wherein the plurality of CVVs being selected
from eight voltage vectors representing eight possible switching states of the 2L-VSI, and as candidates for a primary voltage vector to be applied in the future sampling step; and calculating a cost function for each of the plurality of CVVs, and identifying a primary voltage vector giving a minimum of the cost function as the primary voltage vector to be applied in the future sampling step as a switching state of the 2L-VSI, wherein the cost function is given as a deviation between the predicted stator flux and the reference stator flux.

2. The method of claim 1, wherein the estimating the control variable for the current $k^{th}$ sampling step further comprises estimating the rotor flux for the current $k^{th}$ sampling step by using a rotor flux of a previous $(k-1)^{th}$ sampling step and the stator current of the current $k^{th}$ sampling step.

3. The method of claim 1, wherein the future sampling step comprises a $(k+1)^{th}$ sampling step and a $(k+2)^{th}$ sampling step.

4. The method of claim 3, wherein the cost function $g(V_s^{k+1})$ for a candidate voltage vector $V_s^{k+1}$ for the $(k+1)^{th}$ sampling step is given by a below equation, $$g(V_s^{k+1}) = |\psi_s^{ref} - \psi_s^{k+2}|$$

wherein, $\psi_s^{ref}$ is the reference stator flux, and $\psi_s^{k+2}$ is the predicted stator flux for the $(k+2)^{th}$ sampling step and given further by below equations:

$$\psi_s^{k+2} = \psi_s^{k+1} + T_s(V_s^{k+1} - R_s i_s^{k+1})$$

$$T^{ref} = \frac{3}{2}n_p \lambda L_m (\psi_r^{k+2} \times \psi_s^{ref})$$

$$\psi_s^{ref} = \|\psi_s^{ref}\| \cdot \exp(j \angle \psi_s^{ref})$$

$$\angle \psi_s^{ref} = -\angle \psi_r^{k+2} + \arcsin\left(\frac{T^{ref}}{\frac{3}{2}n_p \lambda L_m \|\psi_r^{k+2}\|\|\psi_s^{ref}\|}\right)$$

where, $$\lambda = \frac{1}{L_s L_r - L_m^2},$$

wherein $T^{ref}$ is a torque reference estimated based on a difference between a reference value and a measured value for the rotor angular speed, $\psi_s^{k+2}$ is a rotor flux estimated for the $(k+2)^{th}$ sampling step, $T_s$ is a duration time of the sampling step, $n_p$ is a number of pole pairs, $L_s$, $L_r$, and $L_m$ each represents a stator inductance, a rotor inductance, and a mutual inductance between the stator and the rotor, respectively.

5. The method of claim 1, wherein the estimating the control variable for the current $k^{th}$ sampling step further comprises estimating a rotor flux for the current $k^{th}$ sampling step by using a rotor flux of a previous $(k-1)^{th}$ sampling step and a stator current of the current $k^{th}$ sampling step.

6. The method of claim 1, wherein the future sampling step comprises a $(k+1)^{th}$ sampling step and a $(k+2)^{th}$ sampling step.

7. The method of claim 6, wherein the cost function $g(V_s^{k+1})$ for a candidate voltage vector $V_s^{k+1}$ for the $(k+1)^{th}$ sampling step is given by a below equation, $$g(V_s^{k+1}) = |\psi_s^{ref} - \psi_s^{k+2}|$$

wherein, $\psi_s^{ref}$ is the reference stator flux, and $\psi_s^{k+2}$ is the predicted stator flux for the $(k+2)^{th}$ step and given further by below equations:

$$\psi_s^{k+2} = \psi_s^{k+1} + T_s(V_s^{k+1} - R_s i_s^{k+1})$$

$$T^{ref} = \frac{3}{2}n_p \lambda L_m (\psi_r^{k+2} \times \psi_s^{ref})$$

$$\psi_s^{ref} = \|\psi_s^{ref}\| \cdot \exp(j \angle \psi_s^{ref})$$

$$\angle \psi_s^{ref} = -\angle \psi_r^{k+2} + \arcsin\left(\frac{T^{ref}}{\frac{3}{2}n_p \lambda L_m \|\psi_r^{k+2}\|\|\psi_s^{ref}\|}\right)$$

where, $$\lambda = \frac{1}{L_s L_r - L_m^2},$$

wherein $T^{ref}$ is a torque reference estimated based on a difference between a reference value and a measured value for the rotor angular speed, $\psi_s^{k+2}$ is a rotor flux estimated for the $(k+2)^{th}$ sampling step, $T_s$ is a duration time of the sampling step, $n_p$ is a number of pole pairs, $L_s$, $L_r$, and $L_m$ each represents a stator inductance, a rotor inductance, and a mutual inductance between the stator and the rotor, respectively.

8. The method of claim 1, wherein the lookup table further comprising a correlation between a stator flux and a torque, wherein the correlation is calculated under a maximum torque per ampere (MPTA) criteria, and wherein the MTPA criteria is achieved under given conditions of a reference torque and a reference rotor angular speed by maintaining a slip frequency at equal to an inverse of a rotor time constant, and wherein, estimating and predicting the reference stator flux is substituted by referring the correlation between the stator flux and the torque in the lookup table when the torque reference is given.

9. An electric drive system comprising:
an induction motor (IM);
a power converter configured to convert a DC input voltage to three phase outputs through a two level-voltage source inverter (2L-VSI);
a DC supply configured to supply the DC input to the power converter;
a controller configured to control the power converter; and
a sensor configured to detect an external variable and send an electrical signal to the controller, the external variable comprising a rotor angular speed or a stator current,
wherein the controller further comprising a processor and a memory, each connected by a bus line,
wherein the controller is further configured to:
store to the memory an initial condition, the initial condition comprising a voltage vector specifying a switching state of the 2L-VSI and a reference rotor angular speed;
wherein the controller is further configured to store, before starting the first sampling step, a lookup table comprising a correlation between a nonzero voltage vector and a voltage vector group, the voltage vector group comprising four candidate voltage vectors (CVVs) and being correlated with the nonzero voltage vector exclusively, wherein,
the nonzero voltage vector represents one of six possible switching states of the 2L-VSI with on state for at least one of but not all of the three phase outputs,
the lookup table defines the correlation between the nonzero voltage vector and the VVG for all six possible cases of the nonzero voltage vector, and
the four CVVs for a voltage vector group correlated with a nonzero voltage vector exclusively are generated by allowing at most one component change to three components of the nonzero voltage vector, and
the controller is further configured to select the plurality of CVVs by referring the lookup table and identifying a voltage vector group corresponding to a nonzero voltage vector, wherein the controller is further configured to choose as the nonzero voltage vector for the current $k^{th}$ sampling step,
a) the primary voltage vector, when the primary voltage vector was the nonzero voltage vector; or
b) a last appeared nonzero voltage vector, when the primary voltage vector was not the nonzero voltage vector;
apply a primary voltage vector as the switching state of the 2L-VSI, wherein the controller is further configured to choose the primary voltage vector
a) from the initial condition when a current $k^{th}$ sampling step is a first sampling step, that is k=1, or
b) from a primary voltage vector determined in a previous $(k-1)^{th}$ sampling step when the current $k^{th}$ sampling step is not the first sampling step, that is k>1;
receive an electrical signal sent by the sensor by detecting an external variable of the current $k^{th}$ sampling step after applying the primary voltage vector, the external variable comprising the rotor angular speed and the stator current;
estimate a control variable for the current $k^{th}$ sampling step based on a mathematical model and by adopting the external variable measured, wherein the control variable comprises a stator flux and a rotor flux;
predict a control variable for a future sampling step for each of a plurality of candidate voltage vectors (CVVs) based on the mathematical model and the control variable estimated for the current sampling step, the control variable for the future sampling step comprising a predicted stator flux and a reference stator flux, wherein the controller is further configured to select the plurality of CVVs in each of the sampling step
from eight voltage vectors representing eight possible switching states of the 2L-VSI, and
as candidates for a primary voltage vector to be applied in the future sampling step;
calculate a cost function for each of the plurality of CVVs; and
identify a primary voltage vector giving a minimum of the cost function as the primary voltage vector to be applied in the future sampling step as a switching state of the 2L-VSI, wherein
the cost function is given as a deviation between the predicted stator flux and the reference stator flux.

10. The electric drive system of claim 9, wherein the controller is configured to estimate a rotor flux for the current $k^{th}$ sampling step by using the rotor flux of a previous $(k-1)^{th}$ sampling step and the stator current of the current $k^{th}$ sampling step.

11. The electric drive system of claim 9, wherein the future sampling step comprises a $(k+1)^{th}$ sampling step and a $(k+2)^{th}$ sampling step.

12. The electric drive system of claim 11, wherein the cost function $g(V_s^{k+1})$ for a candidate voltage vector $V_s^{k+1}$ for the $(k+1)^{th}$ sampling step is given by a below equation, $$g(V_s^{k+1}) = |\psi_s^{ref} - \psi_s^{k+2}|$$

wherein, $\psi_s^{ref}$ is the reference stator flux, and $\psi_s^{k+2}$ is the predicted stator flux for the $(k+2)^{th}$ step and given further by below equations:

$$\psi_s^{k+2} = \psi_s^{k+1} + T_s(V_s^{k+1} - R_s i_s^{k+1})$$

$$T^{ref} = \frac{3}{2} n_p \lambda L_m (\psi_r^{k+2} \times \psi_s^{ref})$$

$$\psi_s^{ref} = \|\psi_s^{ref}\|.\exp(j\angle\psi_s^{ref})$$

$$\angle\psi_s^{ref} = -\angle\psi_r^{k+2} + \arcsin\left(\frac{T^{ref}}{\frac{3}{2} n_p \lambda L_m \|\psi_r^{k+2}\|\|\psi_s^{ref}\|}\right)$$

where, $$\lambda = \frac{1}{L_s L_r - L_m^2},$$

wherein $T^{ref}$ is a torque reference estimated based on a difference between a reference value and a measured value for the rotor angular speed, $\psi_r^{k+2}$ is a rotor flux estimated for the $(k+2)^{th}$ sampling step, $T_s$ is a duration time of the sampling step, $n_p$ is a number of pole pairs, $L_s$, $L_r$, and $L_m$, each represents a stator inductance, a rotor inductance, and a mutual inductance between the stator and the rotor, respectively.

13. The electric drive system of claim 9, wherein the controller is configured to estimate a rotor flux for the current $k^{th}$ sampling step by using a rotor flux of a previous $(k-1)^{th}$ sampling step and a stator current of the current $k^{th}$ sampling step.

14. The electric drive system of claim 9, wherein the future sampling step comprises a $(k+1)^{th}$ sampling step and a $(k+2)^{th}$ sampling step.

15. The electric drive system of claim 14, wherein the cost function $g(V_s^{k+1})$ for a candidate voltage vector $V_s^{k+1}$ for the $(k+1)^{th}$ sampling step is given by a below equation, $$g(V_s^{k+1}) = |\psi_s^{ref} - \psi_s^{k+2}|$$

wherein $\psi_s^{ref}$ is the reference stator flux, and $\psi_s^{k+2}$ is the predicted stator flux for the $(k+2)^{th}$ step and given further by below equations:

$$\psi_s^{k+2} = \psi_s^{k+1} + T_s(V_s^{k+1} - R_s i_s^{k+1})$$

$$T^{ref} = \frac{3}{2} n_p \lambda L_m (\psi_r^{k+2} \times \psi_s^{ref})$$

$$\psi_s^{ref} = \|\psi_s^{ref}\|.\exp(j\angle\psi_s^{ref})$$

$$\angle\psi_s^{ref} = -\angle\psi_r^{k+2} + \arcsin\left(\frac{T^{ref}}{\frac{3}{2} n_p \lambda L_m \|\psi_r^{k+2}\|\|\psi_s^{ref}\|}\right)$$

where, $$\lambda = \frac{1}{L_s L_r - L_m^2},$$

wherein $T^{ref}$ is a torque reference estimated based on a difference between a reference value and a measured value for the rotor angular speed, $\psi_s^{k+2}$ a rotor flux estimated for the $(k+2)^{th}$ sampling step, $T_s$ is a duration time of the sampling step, $n_p$, is a number of pole pairs, $L_s$, $L_r$, and $L_m$ each represents a stator inductance, a rotor inductance, and a mutual inductance between the stator and the rotor, respectively.

16. The electric drive system of claim 9, wherein the lookup table further comprising a correlation between a stator flux and a torque, wherein the correlation is calculated under a maximum torque per ampere (MPTA) criteria, and wherein the MTPA criteria is achieved under given conditions of a reference torque and a reference rotor angular speed by maintaining a slip frequency at equal to an inverse of a rotor time constant, and wherein, the controller is further configured to determine the reference stator flux by referring the correlation between the stator flux and the torque in the lookup table when the torque reference is given.

* * * * *